(12) United States Patent
Kuroda et al.

(10) Patent No.: US 8,189,754 B2
(45) Date of Patent: May 29, 2012

(54) IMAGE SHARING SYSTEM

(75) Inventors: Takaaki Kuroda, Tokyo (JP); Tadayuki Oono, Tokyo (JP); Masayuki Kayahara, Tokyo (JP); Takahiro Shiroshima, Tokyo (JP)

(73) Assignee: NEC Corporation, Tokyo (JP)

( * ) Notice: Subject to any disclaimer, the term of this patent is extended or adjusted under 35 U.S.C. 154(b) by 438 days.

(21) Appl. No.: 12/465,063

(22) Filed: May 13, 2009

(65) Prior Publication Data

US 2009/0296906 A1 Dec. 3, 2009

(30) Foreign Application Priority Data

May 30, 2008 (JP) ................. 2008-141857

(51) Int. Cl.
H04M 3/42 (2006.01)
G06F 15/167 (2006.01)
H04B 7/00 (2006.01)

(52) U.S. Cl. .............. 379/201.01; 379/201.04; 455/518; 709/213

(58) Field of Classification Search ............. 379/201.01, 379/201.04; 455/518; 713/162; 709/213, 709/216, 212
See application file for complete search history.

(56) References Cited

U.S. PATENT DOCUMENTS 7,770,004 B2 * 8/2010 Herf et al. ...................... 713/162
2006/0046755 A1 * 3/2006 Kies ............................... 455/518

FOREIGN PATENT DOCUMENTS

| JP | 2000030073 A | 1/2000 |
|----|--------------|--------|
| JP | 2004064789 A | 2/2004 |
| JP | 2007166018 A | 6/2007 |
| JP | 2007201579 A | 8/2007 |

OTHER PUBLICATIONS

Japanese Office Action for JP2008-141857 dated Apr. 6, 2010.

* cited by examiner

Primary Examiner — Thjuan K Addy

(57) ABSTRACT

An image sharing system includes: a server apparatus; first and second client apparatuses, which are communicably connected with the server apparatus; first and second telephone terminals associated with the first and second client apparatuses respectively; a connection control apparatus for controlling the connection between the first telephone terminal and the second telephone terminal; and a communication terminal including a camera part for photographing a subject, and an image sending part for sending image data representing the image outputted from the camera part, wherein the server apparatus includes a share-image sending part for sending an image represented by image data sent from the communication terminal as a share image to both the first and the second client apparatuses when the first telephone terminal is connected with the second telephone terminal, and both the first and the second client apparatuses include a share-image display part for displaying the share image.

13 Claims, 18 Drawing Sheets

IMAGE SHARING SYSTEM

This application is based upon and claims the benefit of priority from Japanese patent Application No. 2008-141857 filed on May 30, 2008, the disclosure of which is incorporated herein in its entirety by reference.

BACKGROUND OF THE INVENTION

1. Field of the Invention

The present invention relates to an image sharing system for displaying the same image on a plurality of client apparatuses.

2. Description of the Related Art

An image sharing system including a server apparatus, and a first client apparatus and a second client apparatus which are communicably connected with the server apparatus is known (see, for example, Japanese Patent Laid-Open No. 2007-166018).

In that image sharing system, the server apparatus sends to the first client apparatus and the second client apparatus respectively, a share image which means an image that is to be shared between the first and the second client apparatuses. As a result, the first client apparatus and the second client apparatus display the same share image.

In that image sharing system, the user of the first client apparatus and the user of the second client apparatus can view the same image at the same time.

By the way, in general, PCs (Personal Computers) often have no camera function. Therefore, when a user registers a new share image in an image sharing system, the user will transfer an image taken by a camera to a PC, for example, by connecting the camera to the PC. Then the user needs to perform an operation to send the image in the PC to a server apparatus. Thus, the above described image sharing system has a problem in that the user is required to perform a complicated operation when newly registering a share image in the image sharing system.

SUMMARY OF THE INVENTION

Accordingly, it is an exemplary object of the invention to provide an image sharing system which can solve the above described problem in which the user is required to perform a complicated operation when newly registering a share image in an image sharing system.

In order to achieve such object, an image sharing system according to an exemplary aspect of the invention comprises: a server apparatus; a first client apparatus and a second client apparatus, which are communicably connected to the server apparatus; a first telephone terminal associated with the first client apparatus; a second telephone terminal associated with the second client apparatus; a connection control apparatus for controlling the connection between the first telephone terminal and the second telephone terminal and sending connection state information indicating whether or not the first telephone terminal is connected with the second telephone terminal, to the server apparatus; and a communication terminal including a camera part for photographing a subject to output an image of the subject, and an image sending part for sending image data representing the image outputted from the camera part, wherein the server apparatus includes a share-image sending part for sending an image represented by image data sent from the communication terminal as a share image that is to be shared among a plurality of client apparatuses to both the first client apparatus and the second client apparatus when the connection state information indicates that the first telephone terminal is connected with the second telephone terminal, and both the first client apparatus and the second client apparatus include a share-image display part for displaying the share image.

Further, a method of sharing an image according to another exemplary aspect of the invention comprises: a communication terminal photographing a subject to output an image of the subject; the communication terminal sending image data representing the outputted image; whereby a first telephone terminal associated with a first client apparatus is connected with a second telephone terminal associated with a second client apparatus, a server apparatus sends an image represented by the image data sent from the communication terminal as a share image to be shared among a plurality of client apparatuses, to both the first client apparatus and the second client apparatus which are communicably connected to the server apparatus; and both the first client apparatus and the second client apparatus display the share image.

Further, a server apparatus according to a further exemplary aspect of the invention is a server apparatus communicably connected with a first client apparatus and a second client apparatus, the server apparatus comprising: a share-image sending part for sending an image represented by image data sent from a communication terminal as a share image that is to be shared among a plurality of client apparatuses to both the first client apparatus and the second client apparatus, when a first telephone terminal associated with the first client apparatus is connected with a second telephone terminal associated with the second client apparatus, the communication terminal comprising: a camera part for photographing a subject to output an image of the subject and an image sending part for sending image data representing the image outputted by the camera part.

Further, a computer readable recording medium according to a further exemplary aspect of the invention is a computer readable recording medium for recording a program whereby a server apparatus communicably connected with a first client apparatus and a second client apparatus is caused to send a share image that is to be shared among a plurality of client apparatuses to both the first client apparatus and the second client apparatus, wherein the computer readable recording medium records a program for implementing a share-image sending function, whereby when a first telephone terminal associated with the first client apparatus is connected with a second telephone terminal associated with the second client apparatus, the server apparatus is caused to send an image which is represented by the image data sent from a communication terminal as the share image, to both the first client apparatus and the second client apparatus, the communication terminal including: a camera part for photographing a subject to output an image of the subject; and an image sending part for sending image data representing the image outputted by the camera part.

With the configuration as described above, the image sharing system according to an exemplary aspect of the invention enables that an image of a subject photographed by a communication terminal is used as a share image to be shared among a plurality of client apparatuses. Therefore, there is no need for the user to perform the operation to send the image photographed by a camera and stored in a first client apparatus to a server apparatus. As a result of that, it is possible to reduce the time and effort of the user when newly registering a share image to the image sharing system. That is, it is possible to enhance user convenience.

The above and other objects, features and advantages of the present invention will become apparent with reference to the accompanying drawings which illustrate examples of the present invention.

DETAILED DESCRIPTION OF THE EXEMPLARY EMBODIMENTS

Hereinafter, exemplary embodiments of an image sharing system, an image sharing method, a server apparatus, and a program will be described with reference to FIGS. 1 to 9.

Figure 1:
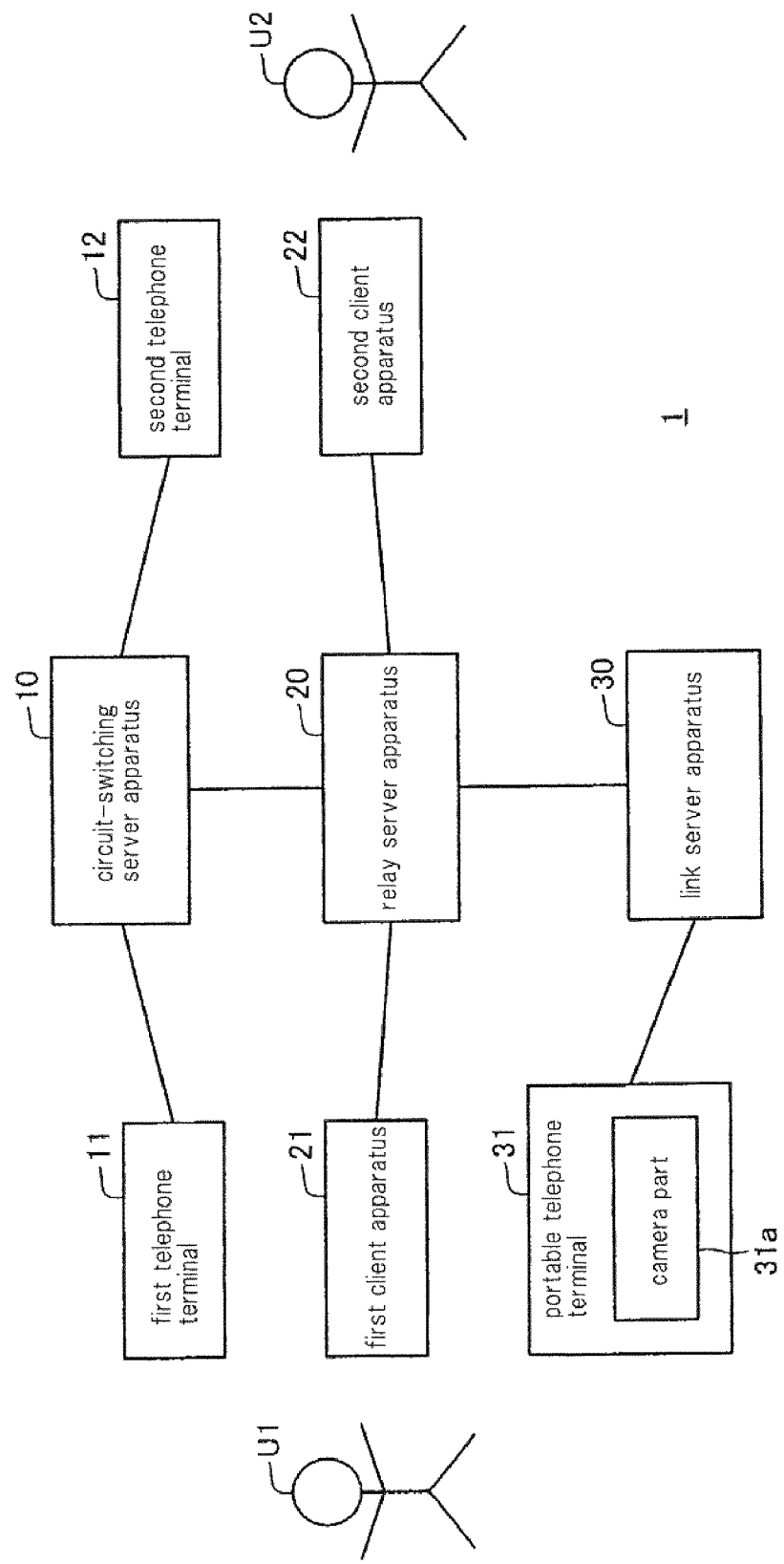
FIG. 1 is a schematic diagram to show the configuration of an image sharing system relating to an exemplary embodiment.

As shown in FIG. 1, image sharing system 1 relating to an exemplary embodiment includes circuit-switching server apparatus 10, first telephone terminal 11, second telephone terminal 12, relay server apparatus 20, first client apparatus 21, second client apparatus 22, link server apparatus 30, and portable telephone terminal (communication terminal) 31. It is noted that relay server apparatus 20 and link server apparatus 30 may also be referred to as a "sever apparatus" in the present description. Circuit-switching server apparatus 10 may also be referred to as a "connection control apparatus." Relay server apparatus 20 may also be referred to as a "cooperation server apparatus." Link server apparatus 30 may also be referred to as a "communication-terminal link server apparatus." Portable telephone terminal 31 may also be referred to as a "communication terminal."

Further, circuit-switching server apparatus 10 and relay server apparatus 20 are communicably connected via a communication line. Furthermore, relay server apparatus 20 and link server apparatus 30 are communicably connected via a communication line.

First telephone terminal 11 or second telephone terminal 12 is a telephone set which inputs and outputs voices and can transfer voice information representing voices. First telephone terminal 11 is assigned first telephone number TEL1. Further, second telephone terminal 12 is assigned second telephone number TEL2. That is, each telephone terminal 11, 12 is assigned a telephone number unique to each telephone terminal. Therefore, a telephone number is telephone-terminal identification information for identifying telephone terminals. First telephone terminal 11 is used by user U1. Second telephone terminal 12 is used by user U2.

Circuit-switching server apparatus 10 communicably connects a plurality of telephone terminals including first telephone terminal 11 and second telephone terminal 12 via a PSTN (Public Switched Telephone Network). Circuit-switching server apparatus 10 connects those telephone terminals such that voice information can be mutually transferred, that is, a telephone call becomes possible between two telephone terminals within the plurality of telephone terminals.

Further, circuit-switching server apparatus 10 includes a CPU (Central Processing Unit) not shown, a memory and an HDD (Hard Disk Drive) which are storage devices, and a communication apparatus. Circuit-switching server apparatus 10 is configured to implement the function described below as the result of the CPU executing a program stored in a storage device.

First client apparatus 21 or second client apparatus 22 is a personal computer and includes a CPU, a storage device which is a memory medium and an HDD, and a communication apparatus, which are not shown. There is stored in the storage device of each client apparatus 21, 22 an image sharing program for sharing an image.

Each client apparatus 21, 22 is configured to achieve the function described below as the result of the CPU executing a program stored in the storage device. First client apparatus 21 is used by user U1. Second client apparatus 22 is used by user U2.

Further, each client apparatus 21, 22 includes an input device such as a keyboard and a mouse, etc. not shown. Each client apparatus 21, 22 is configured such that information is inputted via the input device. Furthermore, each client apparatus 21, 22 includes a display not shown. Each client apparatus 21, 22 displays an image made up of characters and graphics, etc. on the display.

Relay server apparatus 20 includes a CPU, a storage device which is a memory and an HDD, and a communication apparatus, which are not shown. Relay server apparatus 20 is configured to implement the function described below as the result of the CPU executing a program stored in the storage device.

Relay server apparatus 20 is communicably connected with a plurality of client apparatuses including first client apparatus 21 and second client apparatus 22 via the Internet. Relay server apparatus 20 sends a share image, which is made up of characters and graphics, etc. and is an image to be shared among plurality of client apparatuses, and editing information for editing the share image, to each of the plurality of client apparatuses.

Portable telephone terminal 31 is a portable telephone set which inputs and outputs voices and which can transfer voice information representing voices. Portable telephone terminal 31 is configured to be able to transfer data which is information other than voice information. Portable telephone terminal 31 is used by user U1.

Further, Portable telephone terminal 31 also includes a CPU and a storage device, which are not shown. Portable telephone terminal 31 is configured to implement the function described below as a result of the CPU executing a program stored in the storage device.

Furthermore, portable telephone terminal 31 includes keys which are multiple button switches and not shown. Portable telephone terminal 31 is configured such that information is inputted via such keys. Further, portable telephone terminal 31 includes a display not shown. Portable telephone terminal 31 displays an image made up of characters and graphics, etc. on the display.

In addition, portable telephone terminal 31 includes camera part 31a. Camera part 31a includes a solid state imaging device and a lens, and photographs a subject in response to a photographing execution instruction from the CPU thereby outputting information representing the image of the subject. Portable telephone terminal 31 switches the state of camera part 31a between a stand-by state in which photographing is performed in response to a user's photographing instruction and a non-standby state in which no photographing is performed. Portable telephone terminal 31 sets the state of camera part 31a to a standby state when first telephone terminal 11 is connected with second telephone terminal 12 so as to be ready for making/receiving telephone calls by way of circuit-switching server apparatus 10. Portable telephone terminal 31 sends image data representing an image outputted by camera part 31a. It is noted that camera part 31a may also be referred to as photographing means in the present description.

Link server apparatus 30 includes a CPU, a memory device which is a memory medium and an HDD, and a communication device, which are not shown. Link server apparatus 30 is configured to implement a function described below as the result of the CPU executing a program stored in the storage device. Link server apparatus 30 is communicably connected with portable telephone terminal 31 via a base station.

Link server apparatus 30 sends an image represented by the image data sent from portable telephone terminal 31 as a share image to first client apparatus 21 and second client apparatus 22 when first telephone terminal 11 is connected with second telephone terminal 12 so as to be ready for making/receiving telephone calls by way of circuit-switching server apparatus 10.

Figure 2:
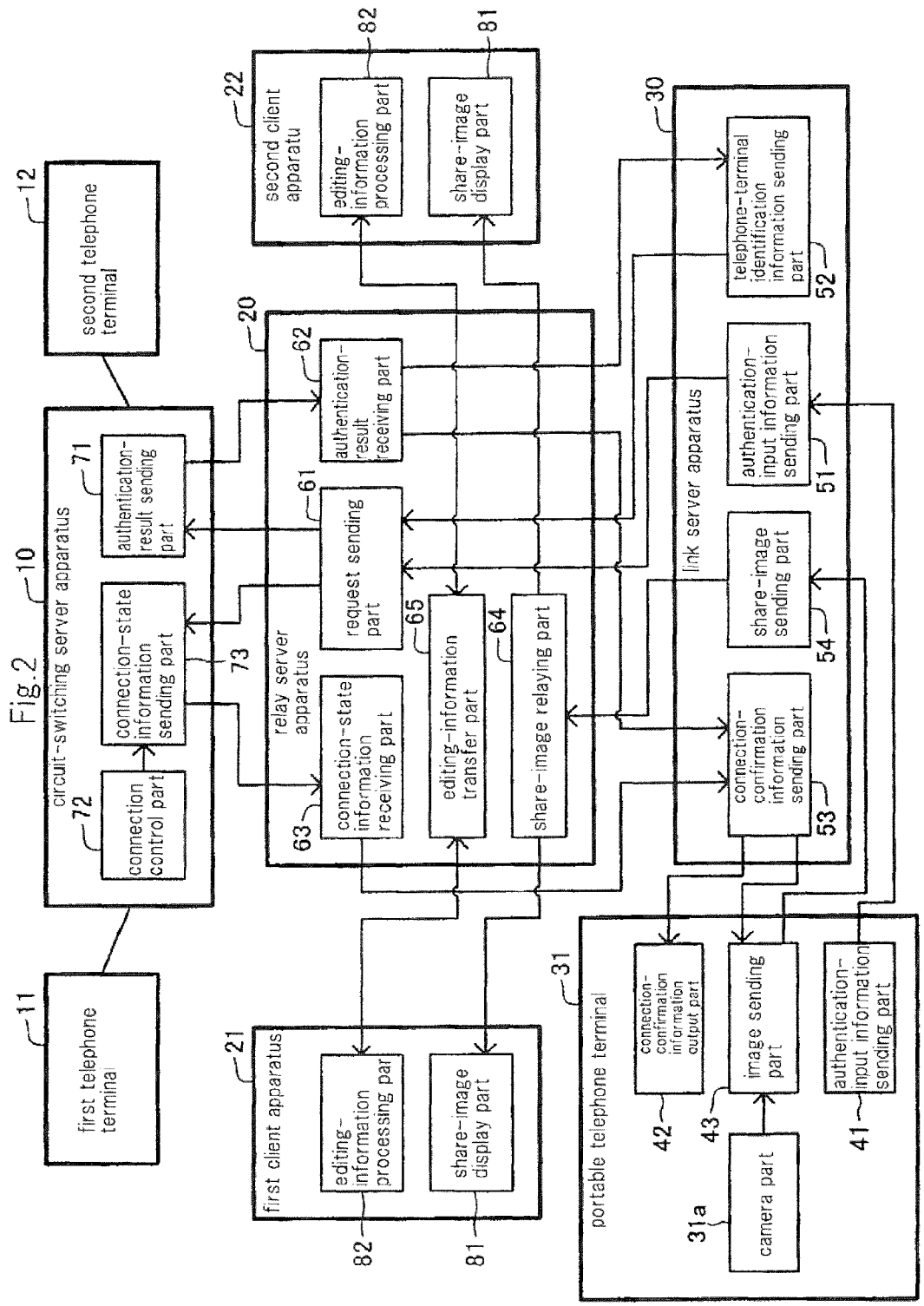
FIG. 2 is a block diagram to show an outline of the function of the image sharing system shown in FIG. 1.

FIG. 2 is a block diagram to show the function relating to the present invention among functions of image sharing system 1 configured as describe above. This function is implemented by executing the following programs, etc. The CPU of portable telephone terminal 31 executes a program represented by the below described flowchart shown in FIG. 3. The CPU of link server apparatus 30 executes programs represented by the below described flowcharts shown in FIGS. 4 and 7, and others. The CPU of relay server apparatus 20 executes programs represented by the below described flowcharts shown in FIGS. 5, 6, 8, 11, 12, and 14 to 17, and others. The CPU of the first client apparatus or the second client apparatus executes a program represented by the below described flowchart shown in FIG. 10. The CPU of the first client apparatus executes a program represented by the below described flowchart shown in FIG. 13. The CPU of the second client apparatus executes a program represented by the below described flowchart shown in FIG. 18.

The functions of portable telephone terminal 31 include authentication-input information sending part 41, connection-confirmation information output part 42, and image sending part 43. It is noted that connection-confirmation information output part 42 may also be referred to as "information output means" in the present description. Image sending part 43 may also be referred to as "image sending means."

Authentication-input information sending part 41 accepts authentication input information inputted by user U1 through the keys, when the authentication input information is information including user IDs which are information representing character strings, and passwords which are information representing character strings. It is noted that in this example, telephone numbers assigned to telephone terminals are used as user IDs. Authentication-input information sending part 41 sends the accepted authentication input information to link server apparatus 30.

Connection-confirmation information output part 42 receives connection confirmation information from link server apparatus 30, when, the connection confirmation information is "authentication-failure information," "non-connection information," or a "combination of connection identification information and telephone-terminal identification information."

The authentication-failure information is information which indicates that authentication based on authentication input information has failed.

Non-connection information is information indicating that a telephone terminal, which is assigned a telephone number of a user ID included in authentication input information, is not connected with any other telephone terminal so as to be ready for making/receiving telephone calls.

Connection identification information is information indicating that a telephone terminal assigned a telephone number of a user ID included in authentication input information is connected with other telephone terminals so as to be ready for making/receiving telephone calls. Further, connection identification information is identification information for identifying a combination of telephone terminals which are connected so as to be ready for making/receiving telephone calls.

A combination of telephone-terminal identification information is a combination of a telephone number of the user ID included in authentication input information, and a telephone number assigned to a telephone terminal which is connected with the telephone terminal assigned the user ID so as to be ready for making/receiving telephone calls.

Connection-confirmation information output part 42 causes an image based on received connection confirmation information to be displayed on a display. Specifically, when the received connection confirmation information is authentication-failure information, connection-confirmation information output part 42 causes an image indicating that the authentication has failed, that is, an image including a message representing the failure to be displayed. Further, when the received connection confirmation information is non-connection information, connection-confirmation information output part 42 causes an image, that indicates that there is no telephone terminal that is connected with a telephone terminal that has been assigned the user ID that is included in the authentication input information so as to be ready for making/receiving telephone calls, to be displayed.

Further, when the received connection confirmation information is a combination of connection identification information and telephone-terminal identification information, connection-confirmation information output part 42 causes an image, that indicates that there is a telephone terminal that is connected with a telephone terminal that has been assigned the user ID that is included in the authentication input information so as to be ready for making/receiving telephone calls, that is, indicating a combination of telephone-terminal identification information, to be displayed.

Image sending part 43 receives connection confirmation information from link server apparatus 30. When the received connection confirmation information includes a combination of connection identification information and telephone-terminal identification information, image sending part 43 sends image data representing the image outputted from camera part 31a to link server apparatus 30. At this moment, image sending part 43 is configured to divide the image into predetermined sending-sizes to send the divided image data.

Further, the functions of link server apparatus 30 include authentication-input information sending part 51, telephone-terminal identification information sending part 52, connection-confirmation information sending part 53, and share-image sending part (a part of share-image sending means) 54.

Authentication-input information sending part 51 receives authentication input information from authentication-input information sending part 41: Authentication-input information sending part 51 sends the received authentication input information to relay server apparatus 20.

Telephone-terminal identification information sending part 52 receives authentication-success identification information (in this example, a session cookie) or authentication-failure information from relay server apparatus 20, when, authentication-success identification information is information indicating that authentication has succeeded.

When having received authentication-success identification information, telephone-terminal identification information sending part 52 sends the received authentication-success identification information and the user ID (telephone number) included in the authentication input information received by authentication-input information sending part 51, to relay server apparatus 20.

Connection-confirmation information sending part 53 receives "non-connection information" or a "combination of connection identification information and telephone-terminal identification information" from relay server apparatus 20. Further, connection-confirmation information sending part 53 receives authentication-success identification information or authentication-failure information from relay server apparatus 20.

When having received authentication-failure information, connection-confirmation information sending part 53 sends the authentication-failure information as connection confirmation information to portable telephone terminal 31. On the other hand, when having received authentication-success identification information and also having received non-connection information, connection-confirmation information sending part 53 sends the non-connection information as the connection confirmation information to portable telephone terminal 31. Further, when having received authentication-success identification information and also having received a combination of connection identification information and telephone-terminal identification information, connection-confirmation information sending part 53 sends the combination of connection identification information and telephone-terminal identification information as the connection confirmation information to portable telephone terminal 31.

Share-image sending part 54 receives image data sent from image sending part 43, and reconstitutes the image before the image is divided based on the received image data. Share-image sending part 54 sends the reconstituted image (share image) to relay server apparatus 20.

Further, the functions of relay server apparatus 20 include request sending part (request sending means) 61, authentication-result receiving part 62, connection-state information receiving part (connection-state information receiving means) 63, share-image relaying part (a part of share-image sending means) 64, and editing-information transfer part (editing information transfer means) 65.

Upon receiving authentication input information from authentication-input information sending part 51, request sending part 61 sends an authentication processing request including the authentication input information and indicating a request for the execution of authentication processing to circuit-switching server apparatus 10.

Further, upon receiving authentication-success identification information and telephone-terminal identification information from telephone-terminal identification information sending part 52, request sending part 61 sends a connection-state information request to circuit-switching server apparatus 10, when the connection-state information request includes the received telephone-terminal identification information. Moreover, the connection-state information request indicates a request for connection state information representing whether or not the telephone terminal assigned the telephone-terminal identification information is currently connected with another telephone terminal.

Authentication-result receiving part 62 receives (information representing) an authentication result from circuit-switching server apparatus 10 in response to the authentication processing request sent by request sending part 61, when the authentication result is authentication-success information indicating that authentication has succeeded or authentication-failure information indicating that authentication has failed. When the received authentication result is authentication-success information, authentication-result receiving part 62 generates authentication-success identification information and sends the generated authentication-success identification information to telephone-terminal identification information sending part 52 and connection-confirmation information sending part 53. On the other hand, when the received authentication result is authentication-failure information, authentication-result receiving part 62 sends the received authentication-failure information to telephone-terminal identification information sending part 52 and connection-confirmation information sending part 53.

Connection-state information receiving part 63 receives connection state information from circuit-switching server apparatus 10 in response to a connection-state information request sent by request sending part 61. Connection-state information receiving part 63 sends the received connection state information to connection-confirmation information sending part 53.

Share-image relaying part 64 receives a share image from share-image sending part 54. Share-image relaying part 64 converts the format of the received share image. Then, share-image relaying part 64 associates the converted share image with the connection identification information included in the connection state information received by connection-state information receiving part 63 to store them into a storage device of relaying server apparatus 20.

On the other hand, relaying server apparatus 20 operates in the same manner as when receiving authentication input information from portable telephone terminal 31 (via relaying server apparatus 30) even when receiving authentication input information from first client apparatus 21 or second client apparatus 22.

Therefore, in this case, connection-state information receiving part 63 receives connection state information from circuit-switching server apparatus 10 based on the user ID included in the authentication input information sent by client apparatuses 21, 22. Then, when connection-state information receiving part 63 receives connection state information including connection identification information (that is, when a plurality of telephone terminals are connected with each other), share-image relaying part 64 sends the share image which is stored in a storage device in association with the connection identification information thereof to client apparatuses 21, 22 which have sent the authentication input information causing connection-state information receiving part 63 to receive the connection identification information.

Further, editing-information transfer part 65 receives editing information which means information that is used for editing from client apparatuses 21 and 22. Editing-information transfer part 65 associates the received editing information with the connection identification information included in the connection state information received by connection-state information receiving part 63 to store them in a storage device in relaying server apparatus 20. Then, when connection-state information receiving part 63 receives connection state information including connection identification information, editing-information transfer part 65 sends the editing information stored in the storage device in association with the connection identification information thereof to client apparatuses 21, 22 which have sent the authentication input information causing connection-state information receiving part 63 to receive the connection identification information. That is, editing-information transfer part 65 relays the editing information which is to be sent from one of client apparatuses 21 and 22 to the other.

Further, the functions of circuit-switching server apparatus 10 include authentication-result sending part 71, connection control part 72, and connection-state information sending part (connection-state information sending means) 73.

Authentication-result sending part 71 allows authentication storage information, which is a combination of a user ID (telephone number) and a password, to be pre-stored in the storage device of circuit-switching server apparatus 10. Authentication-result sending part 71 receives an authentication processing request.

When the combination of the user ID and password included in the received authentication processing request is stored in the storage device, authentication-result sending part 71 sends authentication-success information to authentication-result receiving part 62. On the other hand, when the combination of the user ID and password included in the received authentication processing request is not stored in the storage device, authentication-result sending part 71 sends authentication-failure information to authentication-result receiving part 62.

Connection control part 72 detects a call signal and a response signal from telephone terminals 11, 12 to connect first telephone terminal 11 and second telephone terminal 12 such that a telephone call becomes possible between two telephone terminals 11 and 12. Further, connection control part 72 detects a clearing signal from telephone terminals 11, 12 to release the connection between telephone terminals 11 and 12.

Furthermore, connection control part 72 associates a combination of telephone-terminal identification information to identify each of two telephone terminals 11 and 12 with connection identification information for identifying the connection, which are stored in a storage device of circuit-switching server apparatus 10, while keeping the connection of two telephone terminals 11 and 12 in a state to receive and make telephone calls. That is, when two telephone terminals 11 and 12 are connected in a state to receive and make telephone calls, connection control part 72 causes the combination of telephone-terminal identification information and connection identification information to be stored in association with each other and, on the other hand, when that connection is released, erases the stored combination of telephone-terminal identification information and connection identification information from the storage device.

Connection-state information sending part 73 receives a connection-state information request. When the telephone-terminal identification information included in the received connection-state information request is stored in the storage device in association with the connection identification information, connection-state information sending part 73 sends the connection identification information and the combination of telephone-terminal identification information stored in association with the connection identification information, to connection-state information receiving part 63. On the other hand, when the telephone-terminal identification information included in the received connection-state information request is not stored in the storage device in association with the connection identification information, connection-state information sending part 73 sends non-connection information to connection-state information receiving part 63.

The functions of each client apparatus 21, 22 include share-image display part 81, and editing-information processing part 82. Each client apparatus 21, 22 accepts authentication input information inputted by a user, as with the case of portable telephone terminal 31. Each client apparatus 21, 22 sends the accepted authentication input information to relaying server apparatus 20.

Upon receiving a share image from share-image relaying part 64, share-image display part 81 causes the received share image to be displayed on a display.

Editing-information processing part 82 accepts editing information inputted by a user. Editing-information processing part 82 causes the share image which has been edited based on the accepted editing information, to be displayed on a display. Further, editing-information processing part 82 sends the accepted editing information to editing-information transfer part 65. On the other hand, upon receiving editing information from editing-information transfer part 65, editing-information processing part 82 causes the share image, which has been edited based on the received editing information, to be displayed on a display.

Next, the operation of the above described image sharing system 1 will be concretely described with reference to FIGS. 3 to 18. FIGS. 3 to 18 are flowcharts to show programs to be executed by the CPU of relaying server apparatus 20, first client apparatus 21, second client apparatus 22, link server apparatus 30 or portable telephone terminal 31. FIG. 9 is a sequence diagram to show the data which is information to be transferred among circuit-switching server apparatus 10, relaying server apparatus 20, link server apparatus 30, and portable telephone terminal 31.

Figure 3:
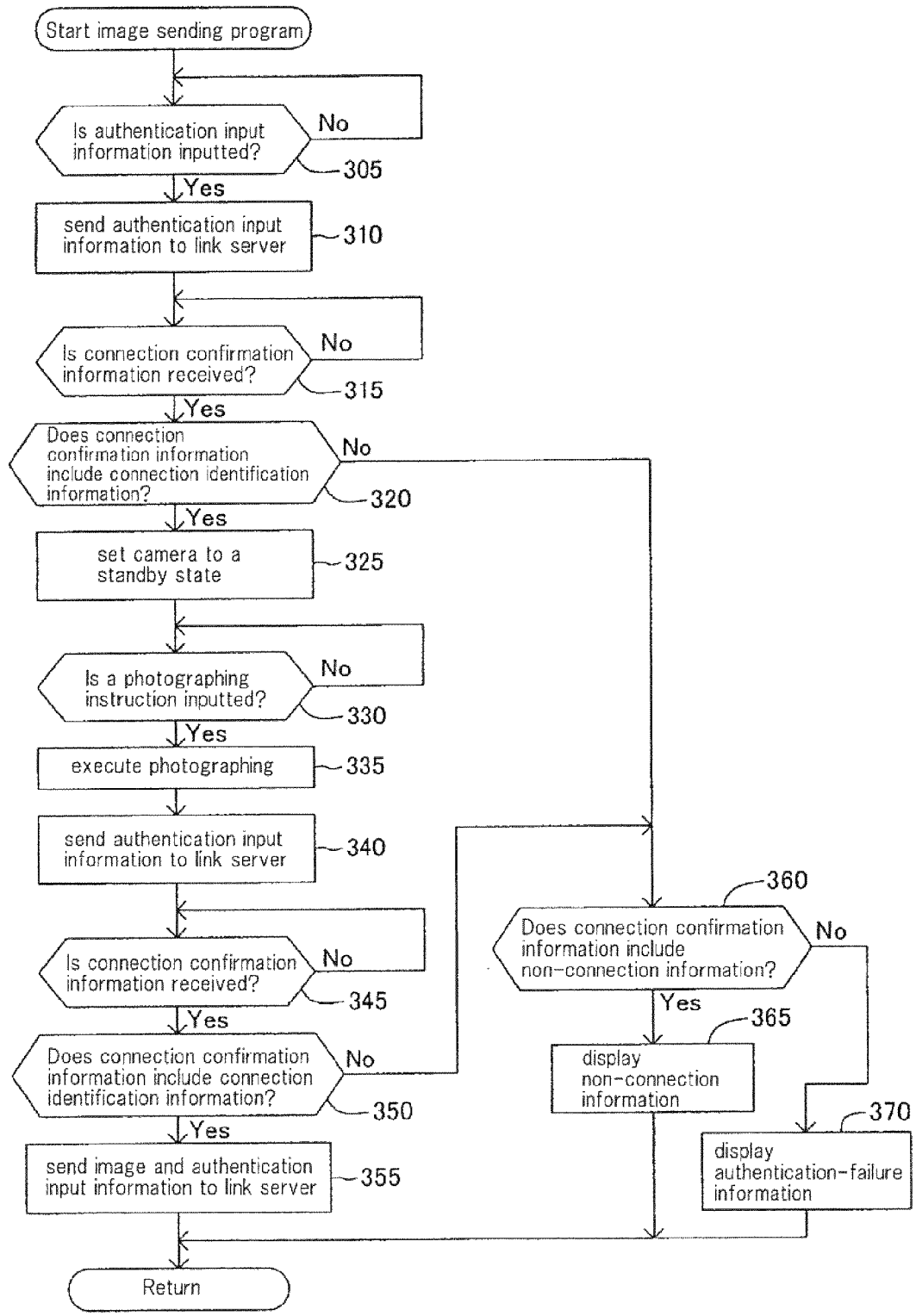
FIG. 3 is a flowchart to show an image sending program to be executed by the CPU of a portable telephone terminal shown in FIG. 1.

The CPU of portable telephone terminal 31 executes an image sending program shown by the flowchart in FIG. 3 in response to an execution instruction inputted by a user.

To be specific, upon starting the processing of the image sending program, the CPU of portable telephone terminal 31 goes into a standby state at step 305 until authentication input information is inputted by a user.

Now description will be continued, assuming a situation in which circuit-switching server apparatus 10 has caused authentication storage information made up of a combination of first telephone number TEL1 and first password PS1, and authentication storage information made up of a combination of second telephone number TEL2 and second password PS2, to be stored in the storage device of circuit-switching server apparatus 10. Further, in this case, description will be continued, assuming that user U1 has inputted first telephone number TEL1 as the user ID and first password PS1 into portable telephone terminal 31.

Therefore, in this case, the CPU of portable telephone terminal 31 makes a determination of "Yes" at step 305 and then proceeds to step 310 to send the inputted authentication input information to link server apparatus 30 (arrow 901 of FIG. 9).

Then, the CPU goes into a standby state at step 315 until receiving connection confirmation information.

Figure 4:
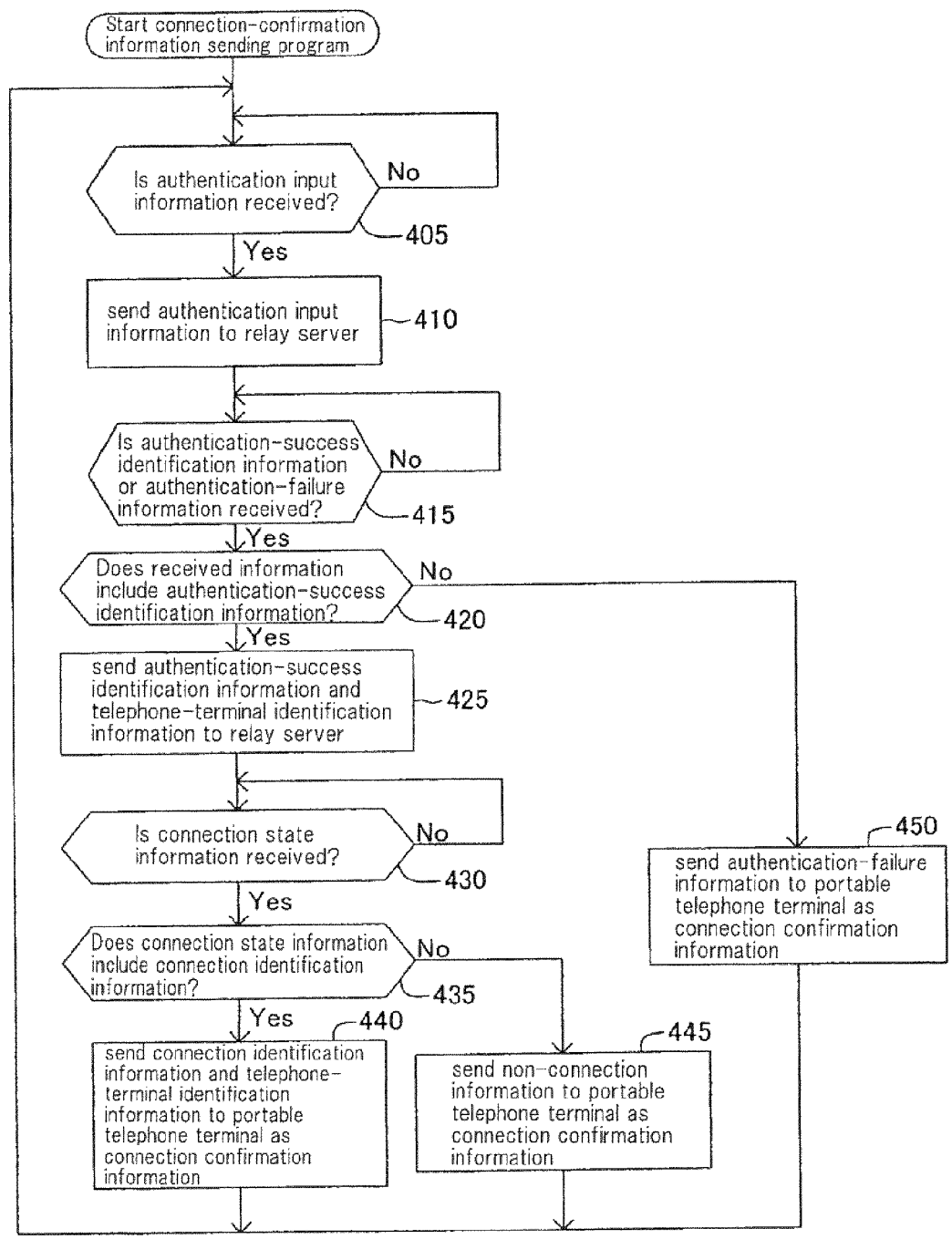
FIG. 4 is a flowchart to show a connection-confirmation information sending program to be executed by the CPU of a link server apparatus shown in FIG. 1.

On the other hand, the CPU of link server apparatus 30 executes connection-confirmation information sending program shown by the flowchart in FIG. 4 upon activation of link server apparatus 30.

To be specific, upon starting the processing of connection-confirmation information sending program, the CPU of link server apparatus 30 goes into a standby state at step 405 until receiving authentication input information. In this state, link server apparatus 30 receives authentication input information from portable telephone terminal 31.

Therefore, the CPU of link server apparatus 30 makes a determination of "Yes" at step 405 and proceeds to step 410 to send the received authentication input information to relaying server apparatus 20 (arrow 902 of FIG. 9).

Then, the CPU goes into a standby state at step 415 until receiving authentication-success identification information or authentication-failure information.

Figure 5:
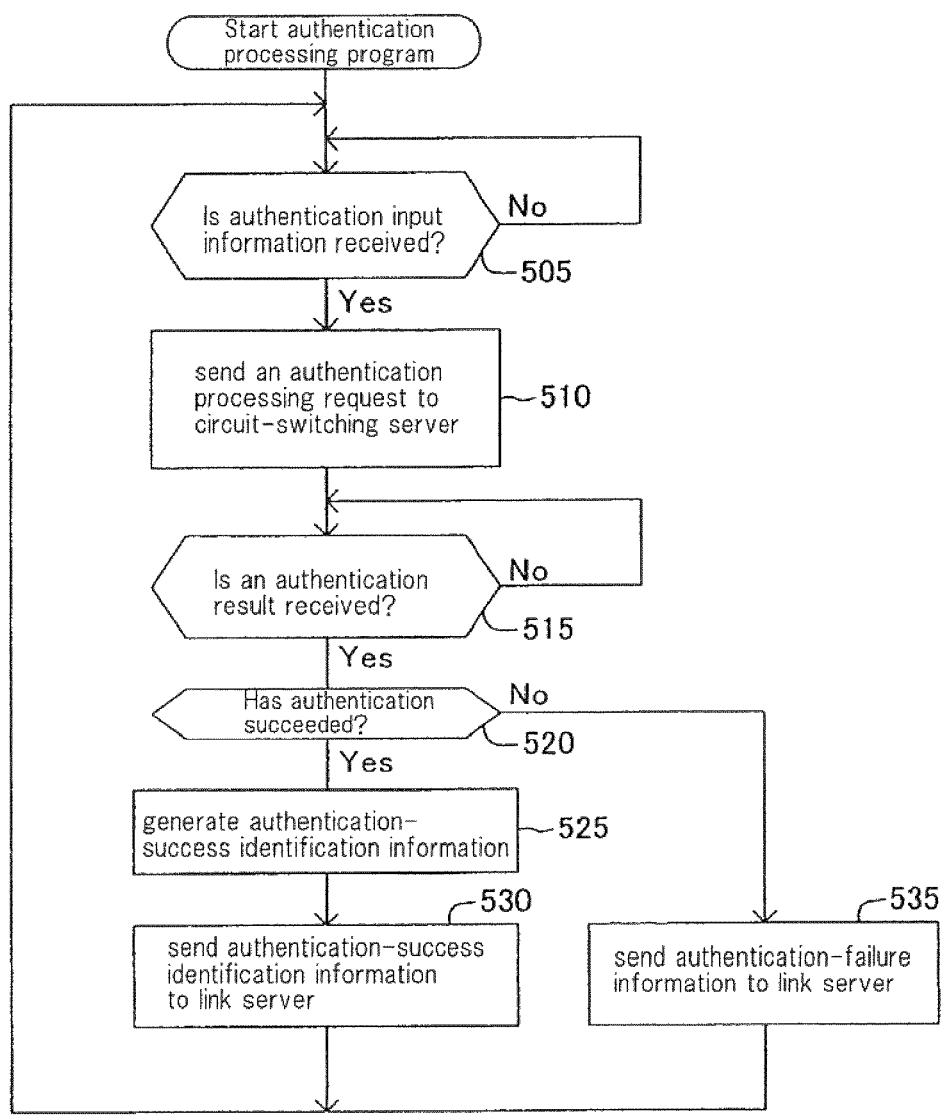
FIG. 5 is a flowchart to show an authentication processing program to be executed by the CPU of a relay server apparatus shown in FIG. 1.

On the other hand, the CPU of relaying server apparatus 20 executes an authentication processing program shown by the flowchart in FIG. 5 upon activation of relaying server apparatus 20.

To be specific, upon starting the processing of the authentication processing program, the CPU of relaying server apparatus 20 goes into a standby state at step 505 until receiving authentication input information. In this state, relaying server apparatus 20 receives authentication input information from link server apparatus 30.

Therefore, the CPU of relaying server apparatus 20 makes a determination of "Yes" at step 505 and proceeds to 510 to send an authentication processing request including the received authentication input information to circuit-switching server apparatus 10 (arrow 903 of FIG. 9).

Then, the CPU goes into a standby state at step 515 until receiving an authentication result.

On the other hand, the CPU of circuit-switching server apparatus 10 is adapted to execute an authentication processing execution program, not shown, upon activation of circuit-switching server apparatus 10. To be specific, upon starting the processing of the authentication processing execution program, the CPU of circuit-switching server apparatus 10 goes into a standby state until receiving an authentication processing request.

In this state, circuit-switching server apparatus 10 receives an authentication processing request from relaying server apparatus 20. Therefore, the CPU of circuit-switching server apparatus 10 determines whether or not the same authentication storage information as the authentication input information (combination of a user ID and a password) included in the authentication processing request is stored in the storage device.

According to the above described assumption, the authentication storage information, which is a combination of first telephone number TEL1 and first password PS1, is stored in the storage device of circuit-switching server apparatus 10. Therefore, the CPU determines that the same authentication storage information as the authentication input information included in the authentication processing request is stored in the storage device.

Then, the CPU of circuit-switching server apparatus 10 sends authentication-success information as the authentication result to relaying server apparatus 20 (arrow 904 of FIG. 9). It is noted that when the same authentication storage information as the authentication input information included in an authentication processing request is not stored in the storage device, the CPU of circuit-switching server apparatus 10 sends authentication-failure information as the authentication result to relaying server apparatus 20.

As a result, relaying server apparatus 20 receives an authentication result from circuit-switching server apparatus 10. Therefore, the CPU of relaying server apparatus 20 makes a determination of "Yes" at step 515 and proceeds to step 520. Then, the CPU determines whether or not authentication has succeeded, that is, whether or not the received authentication result is authentication-success information.

In this state, since relaying server apparatus 20 has received authentication-success information as the authentication result, the CPU makes a determination of "Yes" to proceed to step 525. Then, the CPU generates authentication-success identification information and sends the generated authentication-success identification information to link server apparatus 30 (step 530, arrow 905 of FIG. 9). It is noted that when relaying server apparatus 20 receives authentication-failure information as the authentication result, the CPU proceeds to step 535 to send authentication-failure information to link server apparatus 30.

Thereafter, the CPU returns to step 505 to repeatedly execute the processing of step 505 to step 535.

In this state, link server apparatus 30 receives authentication-success identification information from relaying server apparatus 20. Therefore, the CPU of link server apparatus 30 makes a determination of "Yes" at step 415 to proceed to step 420. Then, the CPU determines whether or not the received information is authentication-success identification information.

At this moment, since link server apparatus 30 has received authentication-success identification information, the CPU of link server apparatus 30 makes a determination of "Yes" and proceeds to step 425 to send the received authentication-success identification information, and the telephone number of a user ID, which is telephone-terminal identification information of the authentication input information received at the above described step 405, to relaying server apparatus 20 (arrow 906 of FIG. 9).

Next, the CPU proceeds to step 430 and goes into a standby state until receiving connection state information.

Figure 6:
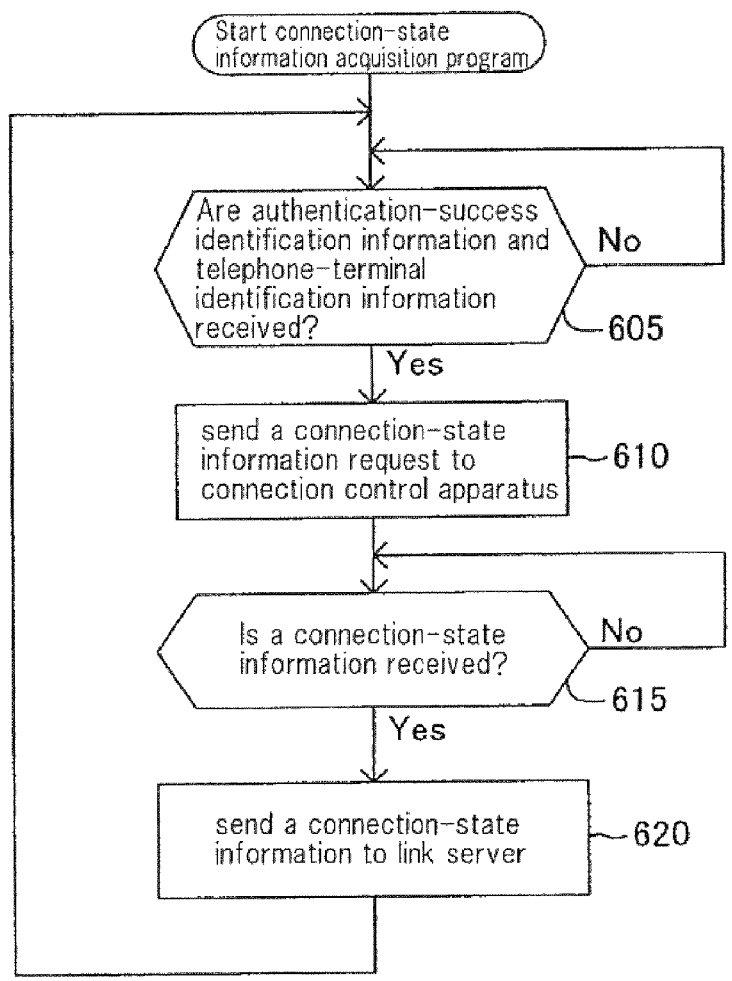
FIG. 6 is a flowchart to show a connection-state information acquisition program to be executed by the CPU of the relay server apparatus shown in FIG. 1.

On the other hand, the CPU of relaying server apparatus 20 executes a connection-state information acquisition program shown by the flowchart in FIG. 6 upon activation of relaying server apparatus 20.

To be specific, upon starting the processing of the connection-state information acquisition program, the CPU of relaying server apparatus 20 goes into a standby state at step 605 until receiving authentication-success identification information and telephone-terminal identification information. In this state, relaying server apparatus 20 receives authentication-success identification information and telephone-terminal identification information from link server apparatus 30.

Therefore, the CPU of relaying server apparatus 20 makes a determination of "Yes" at step 605 and proceeds to step 610 to send a connection-state information request including the received telephone-terminal identification information to circuit-switching server apparatus 10 which is a connection control apparatus (arrow 907 of FIG. 9).

Then, the CPU goes into a standby state at step 615 until receiving connection state information.

On the other hand, the CPU of circuit-switching server apparatus 10 executes a connection-state information sending program, not shown, upon activation of circuit-switching server apparatus 10. To be specific, upon starting the processing of the connection-state information sending program, the CPU of circuit-switching server apparatus 10 goes into a standby state until receiving a connection-state information request.

In this state, circuit-switching server apparatus 10 receives a connection-state information request from relaying server apparatus 20. Therefore, the CPU of circuit-switching server apparatus 10 determines whether or not the same telephone-terminal identification information as the telephone-terminal identification information included in the connection-state information request is stored in the storage device of circuit-switching server apparatus 10 in association with connection identification information.

Now, description will be continued, assuming that circuit-switching server apparatus 10 detects a call signal from first telephone terminal 11 and also detects a response signal from second telephone terminal 12 thereby connecting first telephone terminal 11 and second telephone terminal 12 such that a telephone call becomes possible between two telephone terminals 11 and 12.

In this case, circuit-switching server apparatus 10 causes a combination of telephone-terminal identification information for identifying first telephone terminal 11 and second telephone terminal 12, and the connection identification information for identifying that connection to be stored in association with each other in the storage device of circuit-switching server apparatus 10.

Therefore, the CPU of circuit-switching server apparatus 10 determines that the same telephone-terminal identification information as the telephone-terminal identification information included in the connection-state information request is stored in the storage device of circuit-switching server apparatus 10 in association with connection identification information.

Then, the CPU of circuit-switching server apparatus 10 sends connection identification information stored in association with the same telephone-terminal identification information as the telephone-terminal identification information included in the connection-state information request, and the combination of telephone-terminal identification information stored in association with the connection identification information, to relaying server apparatus 20 as connection state information (arrow 908 of FIG. 9).

It is noted that when the same telephone-terminal identification information as the telephone-terminal identification information included in the connection-state information request is not stored in the storage device of circuit-switching server apparatus 10 in association with the connection identification information, the CPU of circuit-switching server apparatus 10 sends non-connection information as the connection state information to relaying server apparatus 20.

As a result, relaying server apparatus 20 receives connection state information from circuit-switching server apparatus 10. Therefore, the CPU of relaying server apparatus 20 makes a determination of "Yes" at step 615 and proceeds to step 620 to send the received connection state information to link server apparatus 30 (arrow 909 of FIG. 9).

Thereafter, the CPU returns to step 605 and repeatedly executes the processing of step 605 to step 620.

As a result, link server apparatus 30 receives connection state information from relaying server apparatus 20. Accordingly, the CPU of link server apparatus 30 makes a determination of "Yes" at step 430 and proceeds to step 435 to determine whether or not the connection state information includes connection identification information.

In this state, since the connection state information includes connection identification information, the CPU makes a determination of "Yes" and proceeds to step 440 to send the connection identification information included in the received connection state information and a combination of telephone-terminal identification information to portable telephone terminal 31 as connection confirmation information (arrow 910 of FIG. 9). It is noted that when the connection state information does not include connection identification information, the CPU proceeds to step 445 and sends non-connection information to portable telephone terminal 31 as connection confirmation information.

Further, when having received authentication-failure information at the above described step 415, the CPU proceeds to step 450 and sends the authentication-failure information to portable telephone terminal 31 as the connection confirmation information.

Then, the CPU returns to step 405 to repeatedly execute the processing of step 405 to step 450.

As a result of that, portable telephone terminal 31 receives connection confirmation information from link server apparatus 30. Therefore, the CPU of portable telephone terminal 31 makes a determination of "Yes" at step 315 and proceeds to step 320 to determine whether or not the connection confirmation information includes connection identification information.

In this state, since the connection confirmation information includes connection identification information, the CPU makes a determination of "Yes" and proceeds to step 325 to set the state of camera part 31a to a standby state. Then, the CPU stands by at step 330 until a photographing instruction is inputted by user U1.

Thus, portable telephone terminal 31 is configured to set the state of camera part 31a to a standby state when first telephone terminal 11 and second telephone terminal 12 are connected. Due to this configuration, it is possible to prevent that photographing from being needlessly performed. As a result, the time and effort of user U1 are reduced compared with the case in which needless photographing is performed.

Further, when user U1 inputs a photographing instruction, the CPU makes a determination of "Yes" at step 330 and proceeds to step 335 to send a photographing execution instruction to camera part 31a. In response to the photographing execution instruction from the CPU, camera part 31a photographs a subject to output an image of the subject (step 911 of FIG. 9, photographing process).

Then, the CPU sends authentication input information to link server apparatus 30 in step 340 to step 350 as in the above described steps 310 to 320 (arrow 912 of FIG. 9), and receives connection confirmation information from link server apparatus 30 (arrow 913 of FIG. 9)

In this state, as in the above described step 320, the connection confirmation information includes connection identification information (that is, the connection between first telephone terminal 11 and second telephone terminal 12 is maintained). Therefore, the CPU of portable telephone terminal 31 makes a determination of "Yes" at step 350 and proceeds to step 355 to send the image outputted from camera part 31a and the authentication input information inputted at the above described step 305, to link server apparatus 30 (arrow 914 of FIG. 9, image sending process). At this moment, the CPU divides the image into predetermined sending-sizes to send the divided image data.

Thus, portable telephone terminal 31 is configured to send image data when first telephone terminal 11 and second telephone terminal 12 are connected. According to this configuration, it is possible to prevent portable telephone terminal 31 from needlessly sending image data. As a result, it is possible to reduce the amount of data communication sent from portable telephone terminal 31 compared with the case in which image data are needlessly sent.

In addition, the CPU causes an image, which represents a combination of telephone-terminal identification information included in the connection confirmation information received at the above described step 345, to be displayed on a display. It is noted that when the connection confirmation information received at the above described step 315 or step 345 includes non-connection information, the CPU proceeds to step 365 and causes an image, that indicates that there is no telephone terminal connected to be ready to make/receive telephone calls with first telephone terminal 11 that has been assigned to first telephone number TEL1 of the user ID included in the authentication input information, to be displayed on a display.

According to this arrangement, it is possible to make user U1 recognize that first telephone terminal 11 is not connected with second telephone terminal 12. This will result in enhancement of the convenience of user U1.

Further, when the connection confirmation information received at the above described step 315 or step 345 includes authentication-failure information, the CPU proceeds to step 370 and causes an image including a message indicating that authentication has failed to be displayed on a display. According this arrangement, it is possible to make user U1 recognize that authentication based on inputted authentication input information has failed. As a result of that, it is possible to enhance the convenience of user U1.

Then, the CPU completes the execution of the program.

Figure 7:
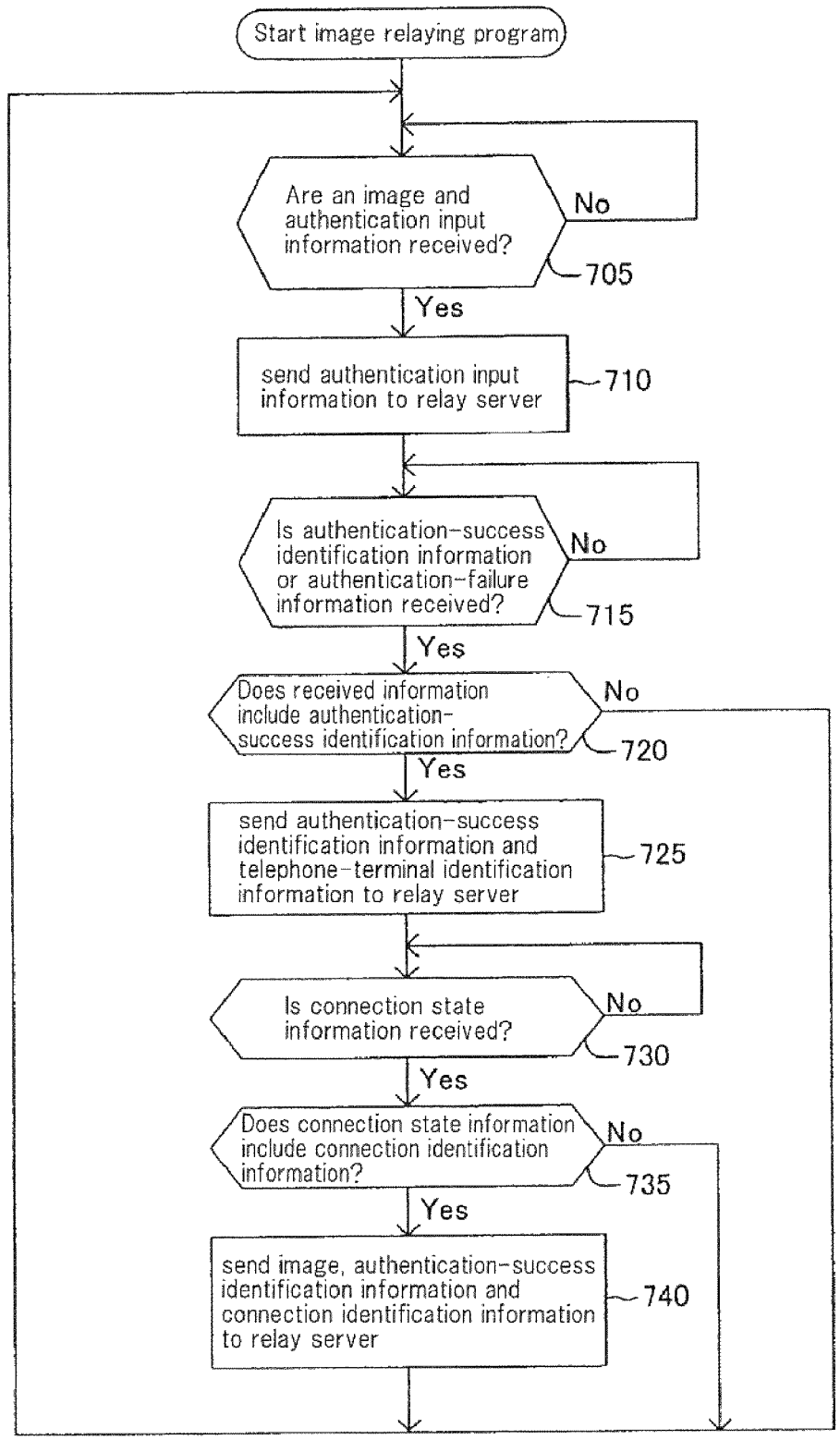
FIG. 7 is a flowchart to show an image relaying program to be executed by the CPU of the link server apparatus shown in FIG. 1.

On the other hand, the CPU of link server apparatus 30 executes an image relaying program shown by the flowchart in FIG. 7 upon activation of link server apparatus 30.

To be specific, upon starting the processing of the image relaying program, the CPU of link server apparatus 30 goes into a standby state at step 705 until receiving image and authentication input information. In this state, link server apparatus 30 receives the image and the authentication input information from portable telephone terminal 31. Specifically, link server apparatus 30 receives image data sent from portable telephone terminal 31 and reconstitutes an image before the image is divided based on the received image data to receive the image.

Therefore, the CPU of link server apparatus 30 makes a determination of "Yes" at step 705. Then, the CPU executes the processing of step 710 to step 735 as in the above described steps 410 to 435 (arrow 915 of FIG. 9). In this state, link server apparatus 30 receives authentication-success identification information (step 715) and connection state information including connection identification information (step 730) from relaying server apparatus 20.

Accordingly, the CPU proceeds to step 740 and sends the share image received at the above described step 705, the authentication-success identification information received at the above described step 715, and the connection identification information received at the above described step 730 to relaying server apparatus 20 (arrow 916 of FIG. 9).

Then, the CPU returns to step 705 to repeatedly execute the processing of step 705 to step 740. It is noted that when having received authentication-failure information at the above described step 715, or having received non-connection information at the above described step 730, the CPU returns to step 705 without executing the processing of the above described step 740.

Figure 8:
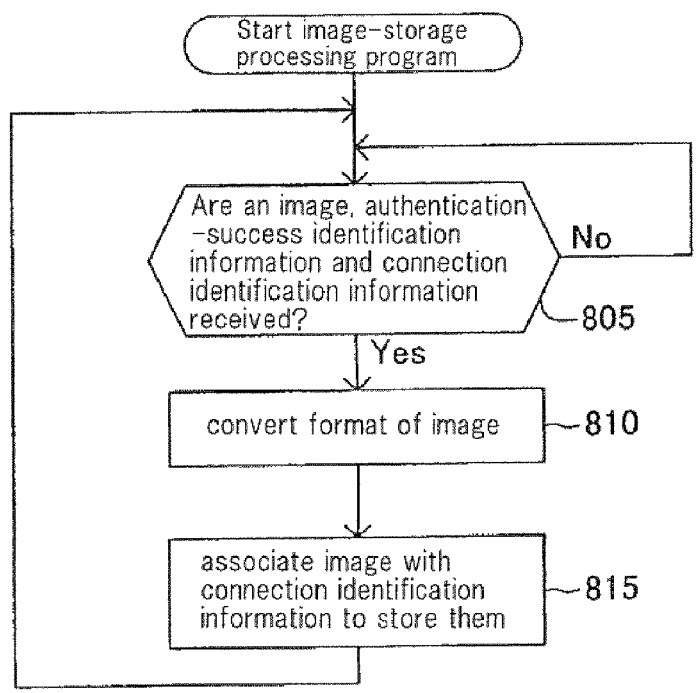
FIG. 8 is a flowchart to show an image-storage processing program to be executed by the CPU of the relay server apparatus shown in FIG. 1.
Figure 9:
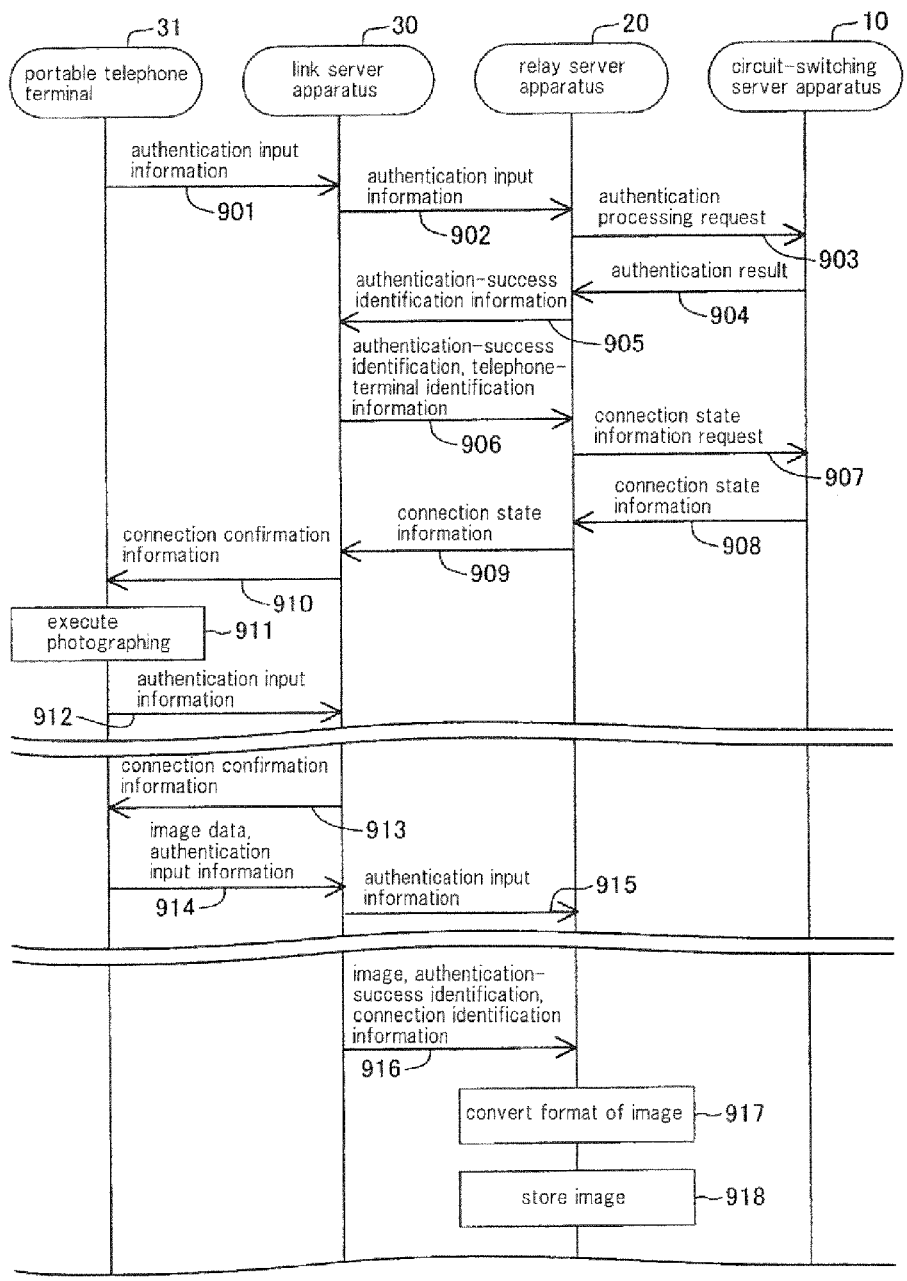
FIG. 9 is a sequence diagram to show the data transferred in the image sharing system shown in FIG. 1.

On the other hand, the CPU of relaying server apparatus 20 executes an image-storage processing program shown by the flowchart in FIG. 8 upon activation of relaying server apparatus 20.

To be specific, upon starting the processing of the image-storage processing program, the CPU of relaying server apparatus 20 goes into a standby state at step 805 until receiving a share image, authentication-success identification information and connection identification information. In this state, relaying server apparatus 20 receives a share image, authentication-success identification information and connection identification information from link server apparatus 30.

Accordingly, the CPU of relaying server apparatus 20 makes a determination of "Yes" at step 805 and proceeds to step 810 to convert the format of the received share image (step 917 of FIG. 9). Then, the CPU proceeds to step 815 and associates the converted share image with the connection identification information received at the above described step 805 to store them in a storage device of relaying server apparatus 20 (step 918 of FIG. 9).

Then the CPU returns to step 805 to repeatedly execute the processing of steps 805 to 815.

In such a state, further assume that the CPU of first client apparatus 21 is executing an image sharing program and the CPU of second client apparatus 22 is executing an image sharing program as well.

Figure 10:
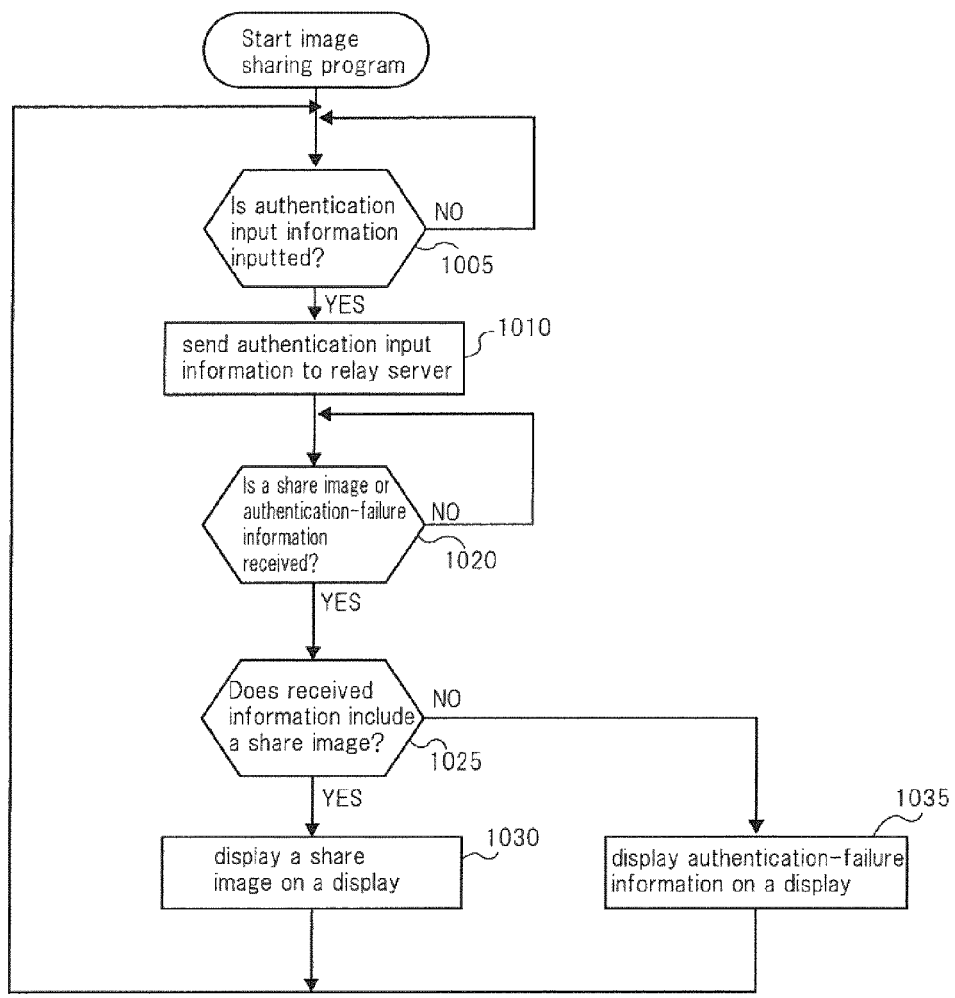
FIG. 10 is a flowchart to show an image sharing program to be executed by the CPU of a first client apparatus or a second client apparatus shown in FIG. 1.

The CPU of each client apparatus 21, 22 executes the image sharing program shown by the flowchart in FIG. 10 upon activation of each client apparatus 21, 22.

To be specific, upon starting the processing of the image sharing program, the CPU of each client apparatus 21, 22 goes into a standby state at step 1005 until with authentication input information is input by a user.

Description will be continued assuming a case in which user U1 thereafter inputs first telephone number TEL1 as the user ID and first password PS1 to first client apparatus 21 and, on the other hand, user U2 inputs second telephone number TEL2 as the user ID, and second password PS2 to second client apparatus 22. It is noted that as a result of first telephone number TEL1 being inputted to first client apparatus 21, first client apparatus 21 is associated with first telephone terminal 11. Further, as a result of second telephone number TEL2 being inputted to second client apparatus 22, second client apparatus 22 is associated with second telephone terminal 12.

In this case, the CPU of first client apparatus 21 accepts authentication input information made up of inputted first telephone number TEL1 and first password PS1. The CPU of first client apparatus 21 sends the accepted authentication input information to relaying server apparatus 20 at every elapse of a predetermined time period (step 1010). Further, the CPU of second client apparatus 22 accepts authentication input information made up of inputted second telephone number TEL2 and second password PS2. The CPU of second client apparatus 22 sends the accepted authentication input information to relaying server apparatus 20 at every elapse of a predetermined time period (step 1010).

Figure 11:
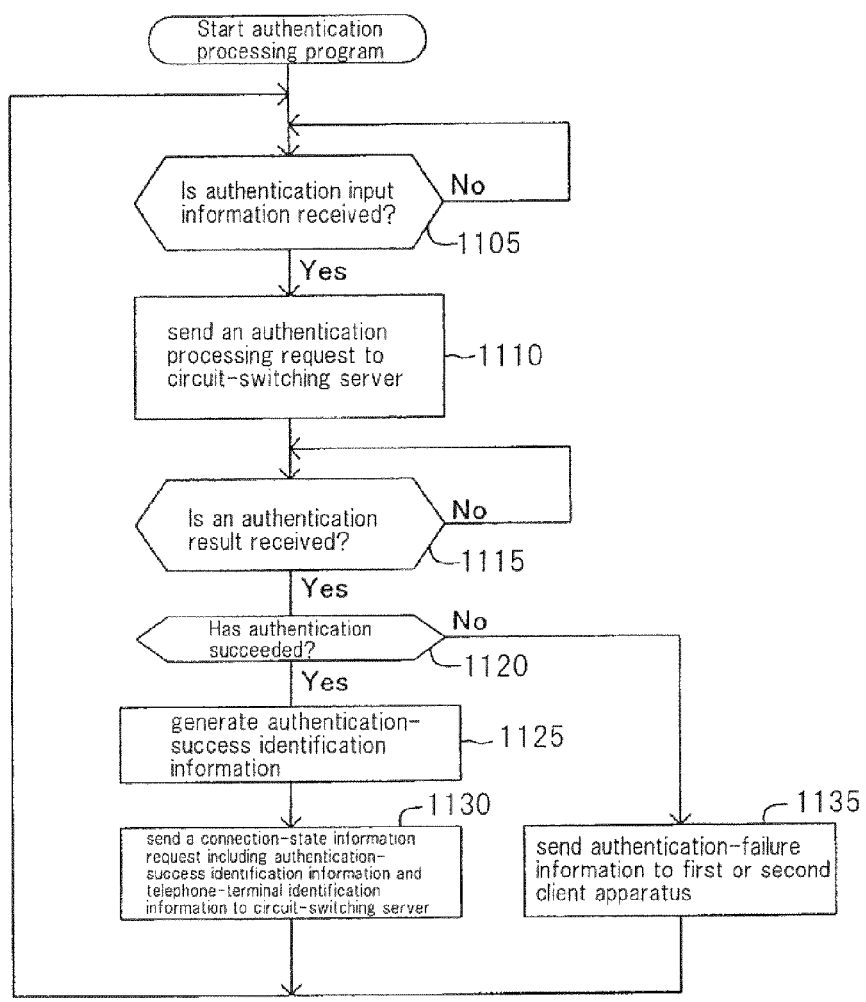
FIG. 11 is a flowchart to show an authentication processing program to be executed by the CPU of the relay server apparatus shown in FIG. 1.

On the other hand, the CPU of relaying server apparatus 20 executes an authentication processing program shown by the flowchart in FIG. 11 upon activation of relaying server apparatus 20.

To be specific, upon starting the processing of the authentication processing program, the CPU of relaying server apparatus 20 goes into a standby state at step 1105 until receiving authentication input information.

Upon receiving authentication input information from client apparatuses 21 and 22, the CPU of relaying server apparatus 20 sends an authentication processing request including the received authentication input information to circuit-switching server apparatus 10 (step 1110). Then, the CPU of relaying server apparatus 20 receives an authentication result from circuit-switching server apparatus 10 (step 1115) and when the received authentication result is authentication-success information (step 1120), generates authentication-success identification information (step 1125) to send a connection-state information request including telephone-terminal identification information included in the authentication input information to circuit-switching server apparatus 10 (step 1130). It is noted that when relaying server apparatus 20 receives authentication-failure information as the authentication result, the CPU proceeds to step 1135 to send the authentication-failure information to client apparatuses 21 and 22.

Thereafter, the CPU returns to step 1105 to repeatedly execute the processing of steps 1105 to 1135.

Figure 12:
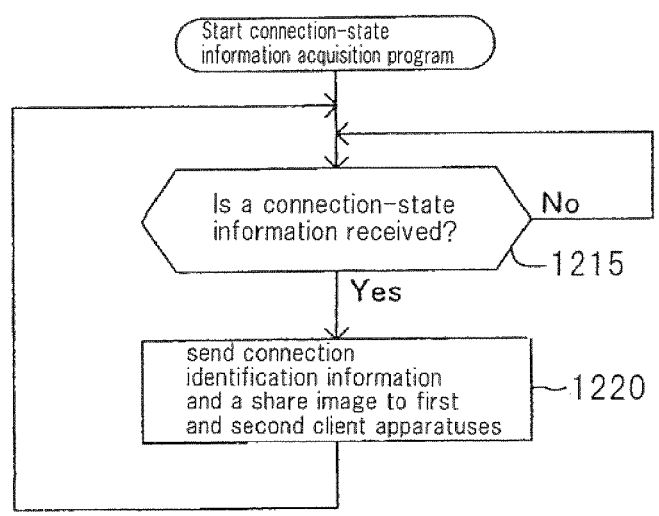
FIG. 12 is a flowchart to show a connection-state information acquisition program to be executed by the CPU of the relay server apparatus shown in FIG. 1.

On the other hand, the CPU of relaying server apparatus 20 is adapted to execute a connection-state information acquisition program shown by the flowchart in FIG. 12 upon activation of relaying server apparatus 20.

To be specific, upon starting the processing of the connection-state information acquisition program, the CPU of relaying server apparatus 20 goes into a standby state at step 1215 until receiving connection state information.

Then, the CPU of relaying server apparatus 20 receives connection state information from circuit-switching server apparatus 10 and, when the received connection state information includes connection identification information, sends the share image stored in association with the connection identification information to client apparatuses 21, 22 which have sent the authentication input information thereby causing the reception of the connection identification information (step 1220)(share-image sending process).

Then, the CPU of each client apparatus 21, 22 goes into a standby state at step 1020 in FIG. 10 until receiving a share image or authentication-failure information.

Upon receiving a share image from relaying server apparatus 20 (step 1025), the CPU of each client apparatus 21, 22 causes the received share image to be displayed on a display (step 1030). Further, after having received authentication-failure information at the above described step 1025, the CPU of each client apparatus 21, 22 proceeds to 1035 to cause the authentication-failure information to be displayed on a display. In this way, the image sent from portable telephone terminal 31 is displayed on first client apparatus 21 and second client apparatus 22. As a result, it becomes possible to have the image photographed by user U1 viewed by user U2 as well.

Figure 13:
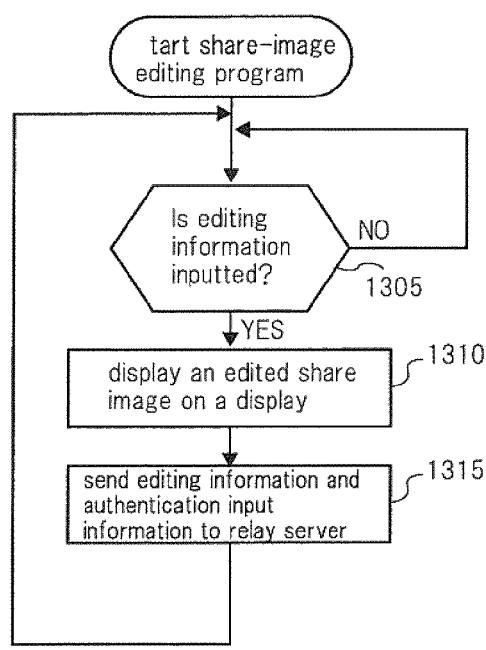
FIG. 13 is a flowchart to show a share-image editing program to be executed by the CPU of the first client apparatus shown in FIG. 1.

The CPU of each client apparatus 21, 22 executes a share-image editing program shown by the flowchart in FIG. 13 upon activation of each client apparatus 21, 22.

To be specific, upon starting the processing of the share-image editing program, the CPU of each client apparatus 21, 22 stands by at step 1305 until editing information to edit the share image is inputted by a user.

Then, description will be continued, assuming a case in which user U1 has inputted editing information to first client apparatus 21.

In this case, the CPU of first client apparatus 21 accepts inputted editing information and causes a share image edited based on the accepted editing information to be displayed on a display (step 1310). Further, the CPU of first client apparatus 21 sends the accepted editing information and authentication input information to relaying server apparatus 20 (step 1315) (editing information sending process).

Figure 14:
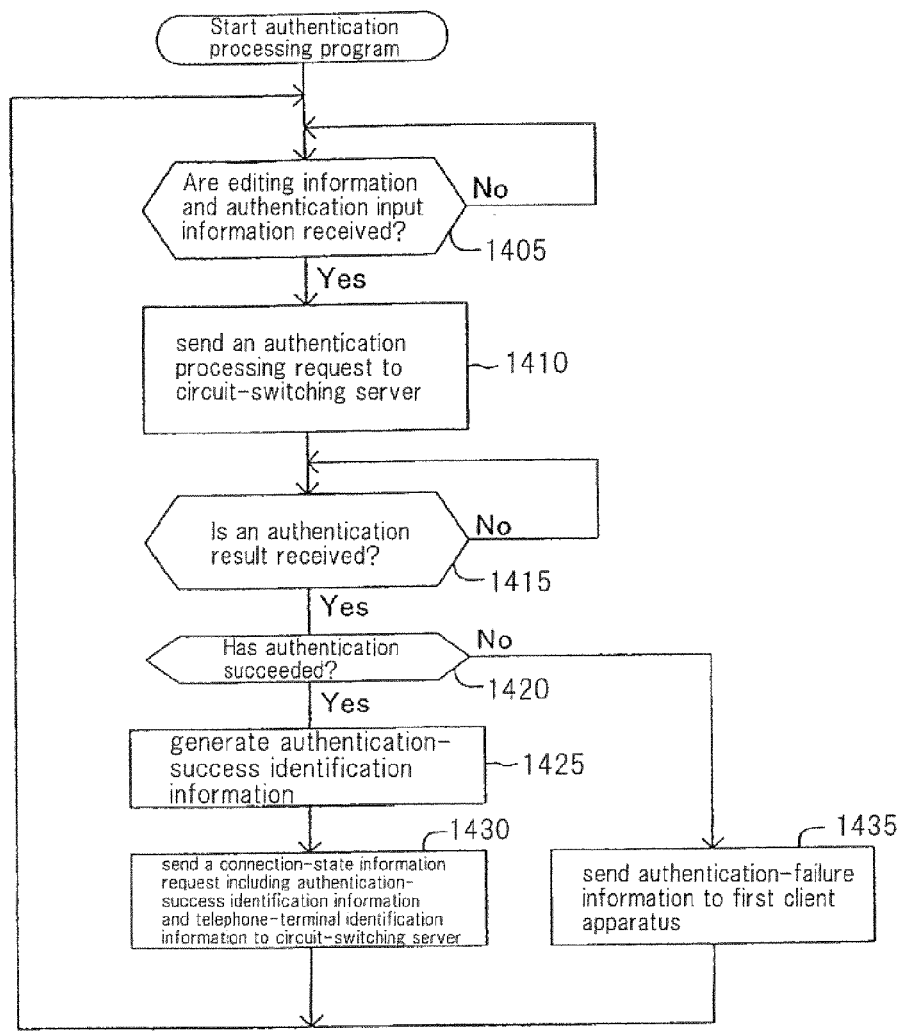
FIG. 14 is a flowchart to show an authentication processing program to be executed by the CPU of the relay server apparatus shown in FIG. 1.

On the other hand, the CPU of relaying server apparatus 20 executes an authentication processing program shown by the flowchart in FIG. 14 upon activation of relaying server apparatus 20.

To be specific, upon starting the processing of authentication processing program, the CPU of relaying server apparatus 20 goes into a standby state at step 1405 until receiving editing information and authentication input information.

Upon receiving editing information and authentication input information from first client apparatus 21, the CPU of relaying server apparatus 20 sends an authentication processing request including the received authentication input information to circuit-switching server apparatus 10 (step 1410). Then, the CPU of relaying server apparatus 20 receives an authentication result from circuit-switching server apparatus 10 (step 1415) and, when the received authentication result is authentication-success information (step 1420), generates authentication-success identification information (step 1425) to send a connection-state information request including telephone-terminal identification information included in the authentication input information to circuit-switching server apparatus 10 (step 1430). It is noted that when relaying server apparatus 20 receives authentication-failure information as the authentication result, the CPU proceeds to step 1435 to send the authentication-failure information to first client apparatus 21.

Figure 15:
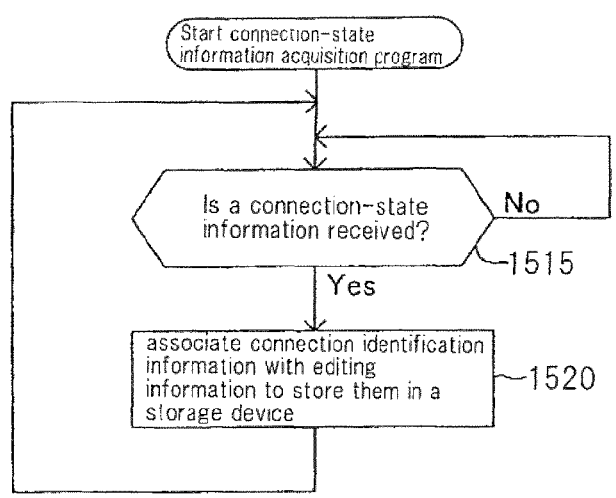
FIG. 15 is a flowchart to show a connection-state information acquisition program to be executed by the CPU of the relay server apparatus shown in FIG. 1.

On the other hand, the CPU of relaying server apparatus 20 executes a connection-state information acquisition program shown by the flowchart in FIG. 15 upon activation of relaying server apparatus 20.

To be specific, upon starting the processing of the connection-state information acquisition program, the CPU of relaying server apparatus 20 goes into a standby state at step 1515 until receiving connection state information.

The CPU of relaying server apparatus 20 receives connection state information from circuit-switching server apparatus 10 and when the received connection state information includes connection identification information, associates the connection identification information with the above described received editing information to store the information in a storage device of relaying server apparatus 20 (step 1520).

Figure 16:
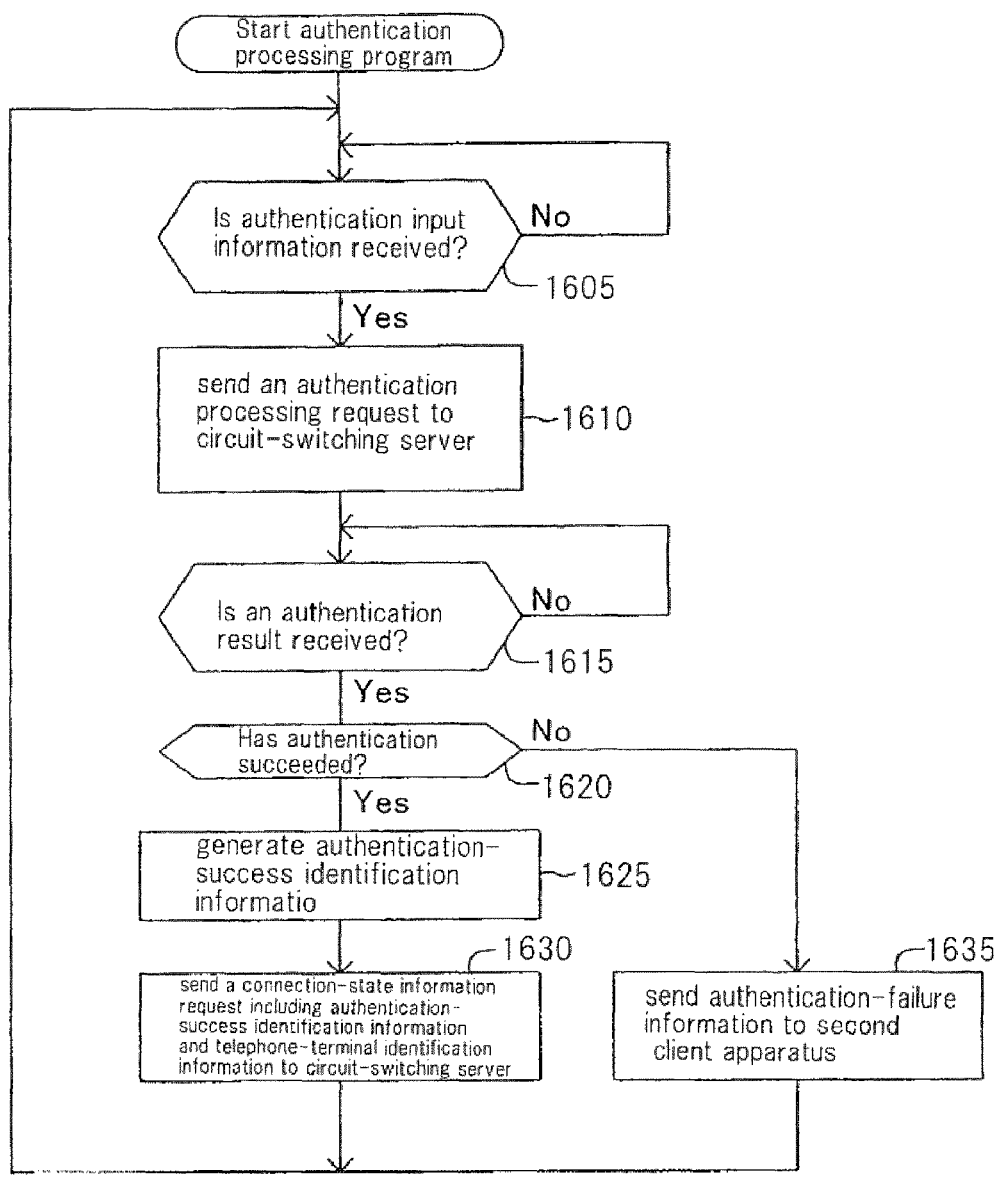
FIG. 16 is a flowchart to show an authentication processing program to be executed by the CPU of the relay server apparatus shown in FIG. 1.

On the other hand, the CPU of relaying server apparatus 20 is adapted to execute an authentication processing program shown by the flowchart in FIG. 16 upon activation of relaying server apparatus 20.

To be specific, upon starting the processing of the authentication processing program, the CPU of relaying server apparatus 20 goes into a standby state at step 1605 until receiving authentication input information.

Further, upon receiving authentication input information from second client apparatus 22 (step 1615), the CPU of relaying server apparatus 20 sends an authentication processing request including the received authentication input information to circuit-switching server apparatus 10 (step 1610). Then, the CPU of relaying server apparatus 20 receives an authentication result from circuit-switching server apparatus 10 (step 1615) and when the received authentication result is authentication-success information (step 1620), generates authentication-success identification information (step 1625) to send a connection-state information request including telephone-terminal identification information included in the authentication input information to circuit-switching server apparatus 10 (step 1630). It is noted that when relaying server apparatus 20 receives authentication-failure information as the authentication result, the CPU proceeds to step 1635 to send the authentication-failure information to second client apparatus 21.

Figure 17:
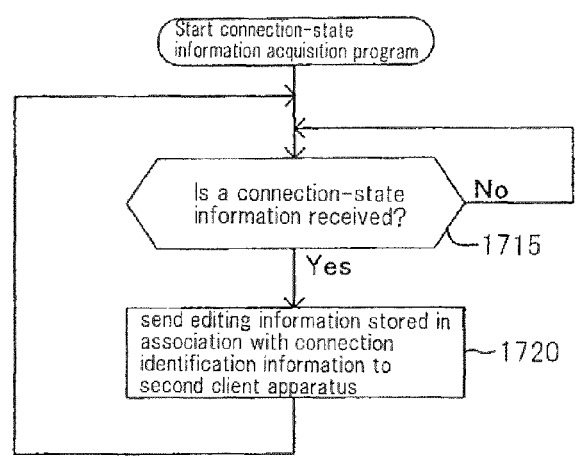
FIG. 17 is a flowchart to show a connection-state information acquisition program to be executed by the CPU of the relay server apparatus shown in FIG. 1.

On the other hand, the CPU of relaying server apparatus 20 executes a connection-state information acquisition program shown by the flowchart in FIG. 17 upon activation of relaying server apparatus 20.

To be specific, upon starting the processing of the connection-state information acquisition program, the CPU of relaying server apparatus 20 goes into a standby state at step 1715 until receiving connection state information.

Then, the CPU of relaying server apparatus 20 receives connection state information from circuit-switching server apparatus 10 and when the received connection state information includes connection identification information, sends the editing information stored in association with the connection identification information to second client apparatus 22 which is the client apparatus that has sent the authentication input information thereby causing reception of the connection identification information (step 1720) (editing information transfer process).

Figure 18:
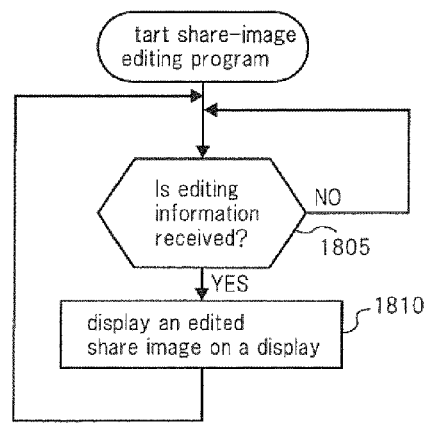
FIG. 18 is a flowchart to show a share-image editing program to be executed by the CPU of the second client apparatus shown in FIG. 1.

The CPU of second client apparatus 22 executes a share-image editing program shown by the flowchart in FIG. 18 upon activation of second client apparatus 22.

To be specific, upon starting the processing of the share-image editing program, the CPU of second client apparatus 22 goes into a standby state at step 1805 until receiving editing information for editing a share image.

Then, upon receiving editing information from relaying server apparatus 20, the CPU of second client apparatus 22 causes a share image edited based on the received editing information to be displayed on a display (step 1810) (share-image displaying process). Thus, the share image edited by first client apparatus 21 is displayed at second client apparatus 22 as well. As a result of that, when user U1 of first client apparatus 21 edits a share image, user U2 of second client apparatus 22 can view the edited share image at about the same time. That is, user U1 of first client apparatus 21 and user U2 of second client apparatus 22 can view the same image at about the same time.

On the other hand, when having received non-connection information from circuit-switching server apparatus 10, the CPU of relaying server apparatus 20 erases the share image and editing information stored in association with the connection identification information relating to the telephone-terminal identification information which has caused the reception of the non-connection information, from the storage device.

As a result, at the time when the connection between first telephone terminal 11 and second telephone terminal 12 is released, it is possible to avoid continuation of the state in which the share image and editing information are kept stored in relaying server apparatus 20.

As so far described, according to the exemplary embodiment of image sharing system, it is possible to use an image of a subject photographed by portable telephone terminal 31 as a share image. Therefore, there is no need for user U1 to perform the operation to store the image photographed by a camera etc. in first client apparatus 21 and to send the stored image from first client apparatus 21 to relaying server apparatus 20. As a result, it is possible to reduce the time and effort of user U1 when newly registering a share image in image sharing system 1. That is, it is possible to enhance the convenience of user U1.

It is noted that the present invention will not be limited to the above described exemplary embodiment, but may adopt various modifications within its scope. For example, in the above described exemplary embodiment, although user IDs of authentication input information are telephone numbers, they may be any character string other than telephone numbers. In this case, it is preferable that circuit-switching server apparatus 10 stores telephone numbers, character strings as user IDs, and character strings as passwords in association with each other. Further, a server apparatus other than circuit-switching server apparatus 10 may store telephone numbers and character strings as user IDs in association with each other.

Further, the above described exemplary embodiment is configured such that each client apparatus 21, 22 sends authentication input information to relaying server apparatus 20 at every elapse of a predetermined time period so that each client apparatus 21, 22 receives a share image and editing information from relaying server apparatus 20. However, the above described exemplary embodiment may be configured such that relaying server apparatus 20 sends a stored share image and editing information to each client apparatus 21, 22 at every predetermined time period or at the moment when the share image or editing information is newly stored. In this case, when having received authentication input information from each client apparatus 21, 22, relaying server apparatus 20 preferably stores authentication input information and the IP (Internet Protocol) address of client apparatus 21, 22 which has sent the authentication input information in association with each other.

Further, in the above described exemplary embodiment, although image sharing system 1 includes both portable telephone terminal 31 and first telephone terminal 11, it may include only portable telephone terminal 31. In this case, portable telephone terminal 31 is used by user U1 as a telephone terminal similar to first telephone terminal 11.

Further, in the above described exemplary embodiment, although image sharing system 1 is configured such that the image can be shared between two client apparatuses 21 and 22, the configuration may be such that the image may be shared among three or more client apparatuses.

Further, in the above described exemplary embodiment, although portable telephone terminal 31 is configured such that whether or not first telephone terminal 11 is connected with second telephone terminal 12 is confirmed before image data is sent, the configuration may be such that image data is sent without confirming whether or not first telephone terminal 11 is connected with second telephone terminal 12.

Further, in the above described exemplary embodiment, although portable telephone terminal 31 is configured such that whether or not first telephone terminal 11 is connected with second telephone terminal 12 is confirmed before the state of camera part 31a is set to a standby state, the configuration may be such that camera part 31 is set to a standby state without confirming whether or not first telephone terminal 11 is connected with second telephone terminal 12.

Further, in the above described exemplary embodiment, although the communication terminal is portable telephone terminal 31, it may be a PDA (Personal Data Assistance), a smart phone, a PHS (Personal Handyphone system), or a game machine, etc. It is noted that the image in the above described exemplary embodiment may be a static image or a dynamic image.

Further, although image sharing system 1 includes both personal telephone terminal 31 and first client apparatus 21, it may include only portable telephone terminal 31. In this case, portable telephone terminal 31 is also used by user U1 as a client apparatus similar to first client apparatus 21.

Further, in the above described exemplary embodiment, relaying server apparatus 20 and link server apparatus 30 are configured to be two, mutually independent server apparatuses. However, the above described exemplary embodiment may be configured to have one server apparatus having functions of relaying server apparatus 20 and link server apparatus 30 in place of relaying server apparatus 20 and link server apparatus 30.

The present invention can be applied to an image sharing system in which the same image is displayed on a plurality of client apparatuses, and a teleconference system and others which utilize the image sharing system.

While the invention has been particularly shown and described with reference to exemplary embodiments thereof, the invention is not limited to these embodiments. It will be understood by those of ordinary skill in the art that various changes in form and details may be made therein without departing from the scope and spirit of the present invention as defined by the claims.

What is claimed is:

1. An image sharing system, comprising:
   a server apparatus;
   a first client apparatus and a second client apparatus, which are communicably connected to said server apparatus;
   a first telephone terminal associated with said first client apparatus;
   a second telephone terminal associated with said second client apparatus;
   a connection control apparatus for controlling a connection between said first telephone terminal and said second telephone terminal; and
   a communication terminal including a photographing means for photographing a subject to output an image of the subject, and an image sending means for sending image data representing the image outputted from said photographing means, wherein
   said server apparatus is configured to send a share image to both said first client apparatus and said second client apparatus;
   both said first client apparatus and said second client apparatus are configured to display said share image,
   said communication terminal is configured to send authentication-input information that is inputted by a user and said image data to said server apparatus,
   said connection control apparatus is configured to store, when said first telephone terminal and said second telephone terminal are connected to each other, a set of telephone terminal identification information to identify said first telephone terminal and telephone terminal identification information to identify said second telephone terminal, and connection identification information to identify the connection, on a one-to-one correspondence basis,
   said server apparatus is configured: to receive said authentication-input information; to acquire telephone terminal identification information based on said received authentication-input information; and to receive connection identification information from said connection control apparatus that is stored in said connection control apparatus in a one-to-one correspondence with said acquired telephone terminal identification information,
   said server apparatus is configured to store the connection identification information that is received based on said authentication-input information received from said communication terminal, and said image data that is received together with said authentication-input information, on a one-to-one correspondence basis,
   both said first client apparatus and said second client apparatus are configured to send authentication-input information inputted by the user, to said server apparatus, and
   said server apparatus is configured to send to a client apparatus that has sent said authentication-input information, as said share image, an image represented by the image data that is stored in a one-to-one correspondence with the connection identification information that is received based on said authentication-input information received from said client apparatus.

2. The image sharing system according to claim 1, wherein when editing information that is used for editing said share image is inputted, said first client apparatus is configured to display said share image which is edited based on said inputted editing information, and to display said inputted editing information to said server apparatus,
   when having received said editing information from said first client apparatus, said server apparatus is configured to send said received editing information to said second client apparatus, and
   when having received said editing information from said server apparatus, said second client apparatus is configured to display said share image edited based on said editing information.

3. The image sharing system according to claim 1, wherein said server apparatus comprises:
   a request sending means for sending to said connection control device a connection-state information request indicating a request for connection state information which represents whether or not said first telephone terminal is connected with said second telephone terminal; and
   a connection-state information receiving means for receiving said connection state information in response to said sent connection-state information request, wherein
   said server apparatus is configured to determine whether or not said share image is to be sent based on said received connection state information, and wherein
   said connection control apparatus comprises
   a connection-state information sending means for sending said connection state information to said server apparatus in response to the connection-state information request received from said server apparatus.

4. The image sharing system according to claim 2, wherein said server apparatus includes a communication-terminal link server apparatus and a relay sever apparatus, wherein
   said communication-terminal link server apparatus is configured to receive image data from said communication terminal and to send the received image data to said relay server apparatus as a share image, and wherein
   said relay server apparatus is configured to send the share image received from said communication-terminal link server apparatus to both said first client apparatus and said second client apparatus, and to relay said editing information sent from said first client apparatus to said second client apparatus.

5. The image sharing system according to claim 1, wherein said image sending means is configured to send said image data when said first telephone terminal is connected with said second telephone terminal.

6. The image sharing system according to claim 1, wherein a state of said photographing means is configured to be switched between a standby state in which said photographing is performed in response to a photographing instruction from a user and a non-standby state in which said photographing is not performed, and when said first telephone terminal is connected with said second telephone terminal, the state of said photographing means is configured to be set to said standby state.

7. The image sharing system according to claim 1, wherein said communication terminal comprises a connection-confirmation information output means which, when said first telephone terminal is not connected with said second telephone terminal, outputs non-connection state information indicating said non-connection state.

8. A method of sharing an image, wherein a server apparatus sends a share image to both a first client apparatus and a second client apparatus, which are communicably connected to said server apparatus, and both said first client apparatus and said second client apparatus display said share image, said method comprising:

by a connection control apparatus, storing, when a first telephone terminal associated with said first client apparatus and a second telephone terminal associated with said second client apparatus are connected to each other, a set of telephone terminal identification information to identify said first telephone terminal and telephone terminal identification information to identify said second telephone terminal, and connection identification information to identify the connection, on a one-to-one correspondence basis;

by a communication terminal, photographing a subject to output an image of the subject, and sending authentication-input information that is inputted by a user and said image data to said server apparatus;

by said server apparatus, acquiring telephone terminal identification information based on said authentication-input information received from said communication terminal, receiving connection identification information from said connection control apparatus that is stored in said connection control apparatus in a one-to-one correspondence with said acquired telephone terminal identification information, and storing said received connection identification information, and said image data that is received together with said authentication-input information from said connection terminal, on a one-to-one correspondence basis, by both said first and second client apparatuses, sending authentication-input information inputted by the user, to said server apparatus, and by said server apparatus, sending to a client apparatus that has sent said authentication-input information, as said share image, an image represented by the image data that is stored in a one-to-one correspondence with the connection identification information that is received from said connection control apparatus based on said authentication-input information received from said client apparatus.

9. The method of sharing an image according to claim 8, further comprising:

when editing information that is used for editing said share image is inputted, by said first client apparatus, displaying said share image which is edited based on said inputted editing information, and sending said inputted editing information to said server apparatus, when having received said editing information from said first client apparatus, by said server apparatus, sending said received editing information to said second client apparatus, and when having received said editing information from said server apparatus, by said second client apparatus, displaying said share image edited based on said editing information.

10. A server apparatus communicably connected with a first client apparatus and a second client apparatus, and configured to send a share image to both said first client apparatus and said second client apparatus, wherein said server apparatus is configured:

to receive authentication-input information; to acquire telephone terminal identification information based on said received authentication-input information; and to receive connection identification information from a connection control apparatus that is stored in said connection control apparatus in a one-to-one correspondence with said acquired telephone terminal identification information, said connection control apparatus controlling a connection between a first telephone terminal associated with said first client apparatus and a second telephone terminal associated with said second client apparatus;

to store the connection identification information that is received from said connection control apparatus based on authentication-input information received from a communication terminal, and said image data that is received together with said authentication-input information from said communication terminal, on a one-to-one correspondence basis, said communication terminal including a photographing means for photographing a subject to output an image of the subject, and an image sending means for sending image data representing the image outputted from said photographing means; and to send to a client apparatus that has sent said authentication-input information, as said share image, an image represented by the image data that is stored in a one-to-one correspondence with the connection identification information that is received from said connection control apparatus based on said authentication-input information received from said client apparatus.

11. The server apparatus according to claim 10, wherein when having received editing information that is used for editing said share image from said first client apparatus, said server apparatus is configured to send said received editing information to said second client apparatus.

12. A computer readable recording medium having a program for operating on a computer for making the computer used as a server apparatus communicably connected with a first client apparatus and a second client apparatus to send a share image to both said first client apparatus and said second client apparatus, said program comprising instructions that cause the computer to perform the steps of:

receiving authentication-input information; acquiring telephone terminal identification information based on said received authentication-input information; and receiving connection identification information from a connection control apparatus that is stored in said connection control apparatus in a one-to-one correspondence with said acquired telephone terminal identification information, said connection control apparatus controlling a connection between a first telephone terminal associated with said first client apparatus and a second telephone terminal associated with said second client apparatus;

storing said connection identification information that is received from said connection control apparatus based on authentication-input information received from a communication terminal, and image data that is received together with said authentication-input information from a communication terminal, on a one-to-one correspondence basis, said communication terminal including a photographing means for photographing a subject to output an image of the subject, and an image sending means for sending image data representing the image outputted from said photographing means; and sending a client apparatus that has sent said authentication-input information, as said share image, an image represented by the image data that is stored in a one-to-one correspondence with the connection identification information that is received from said connection control apparatus based on said authentication-input connection received from said client apparatus.

13. The computer readable recording medium according to claim 12, wherein further comprising a step of sending, when editing-information is received to edit said share image from said first client apparatus, said received editing information to said second client apparatus.

* * * * *